US007417000B2

(12) United States Patent
Barnabas et al.

(10) Patent No.: US 7,417,000 B2
(45) **Date of Patent: *Aug. 26, 2008**

(54) PRE-MOISTENED WIPE COMPRISING POLYMERIC BIGUANIDE FOR TREATING A SURFACE

(75) Inventors: Mary Vijayarani Barnabas, West Chester, OH (US); Alan Edward Sherry, Cincinnati, OH (US); Ann Margaret Wolff, Cincinnati, OH (US)

(73) Assignee: The Procter & Gamle Company, Cincinnati, OH (US)

( * ) Notice: Subject to any disclaimer, the term of this patent is extended or adjusted under 35 U.S.C. 154(b) by 83 days.

This patent is subject to a terminal disclaimer.

(21) Appl. No.: 10/947,777

(22) Filed: Sep. 23, 2004

(65) Prior Publication Data

US 2005/0054257 A1 Mar. 10, 2005

Related U.S. Application Data

(63) Continuation of application No. 10/267,170, filed on Oct. 9, 2002, now abandoned, said application No. 10/947,777 and a continuation-in-part of application No. 10/737,129, filed on Dec. 15, 2003, now Pat. No. 6,936,580, is a continuation of application No. 09/671,718, filed on Sep. 27, 2000, now Pat. No. 6,716,805.

(60) Provisional application No. 60/328,008, filed on Oct. 9, 2001, provisional application No. 60/156,286, filed on Sep. 27, 1999.

(51) Int. Cl.

| | |
|---|---|
| ***B32B 27/04*** | (2006.01) |
| ***D04H 5/02*** | (2006.01) |
| ***D04H 1/54*** | (2006.01) |

(52) U.S. Cl. ........................ 442/123; 442/408; 442/411

(58) Field of Classification Search ................. 442/123, 442/408, 411

See application file for complete search history.

(56) References Cited

U.S. PATENT DOCUMENTS

| | | | | |
|---|---|---|---|---|
| 4,666,621 | A | 5/1987 | Clark et al. | |
| 5,141,803 | A | 8/1992 | Pregozen | |
| 5,993,840 | A | 11/1999 | Fawkes et al. | |
| 6,045,817 | A | 4/2000 | Ananthapadmanabhan et al. | |
| 6,936,580 | B2 * | 8/2005 | Sherry et al. | 510/438 |
| 2003/0133740 | A1 * | 7/2003 | Policicchio et al. | 401/270 |

FOREIGN PATENT DOCUMENTS

| | | | |
|---|---|---|---|
| EP | 0 185 970 | A1 | 7/1986 |
| WO | WO 89/05114 | A1 | 6/1989 |
| WO | WO 97/16066 | A1 | 5/1997 |
| WO | WO 98/56253 | A1 | 6/1998 |
| WO | WO 00/00106 | A1 | 1/2000 |
| WO | WO 01/23510 | A2 | 4/2001 |

* cited by examiner

*Primary Examiner*—Lynda Salvatore
(74) *Attorney, Agent, or Firm*—David V. Upite; Mark A. Charles; Brent M. Peebles

(57) ABSTRACT

The present invention relates to a pre-moistened wipe for treating a surface, said pre-moistened wipe comprising: (a) a substrate; wherein said substrate is substantially free of a binder or latex material and said; and (b) a composition applied to said substrate, said composition having (i) a pH of about 7 or less and comprising (ii) at least about one surfactant; and (iii) a polymeric biguanide.

27 Claims, No Drawings

PRE-MOISTENED WIPE COMPRISING POLYMERIC BIGUANIDE FOR TREATING A SURFACE

CROSS REFERENCE TO RELATED APPLICATIONS

This application is: a continuation of U.S. patent application Ser. No. 10/267,170, filed Oct. 9, 2002, now abandoned which claims the benefit of U.S. Provisional Application No. 60/328,008, filed on Oct. 9, 2001; and is also a continuation-in part of U.S. patent application Ser. No. 10/737,129, filed Dec. 15, 2003, now U.S. Pat. No. 6,936,580 which is a continuation of U.S. patent application Ser. No. 09/671,718, filed Sep. 27, 2000, now U.S. Pat. No. 6,716,805 which claims the benefit of U.S. Provisional Application No. 60/156,286, filed Sep. 27, 1999.

FIELD OF THE INVENTION

The present invention relates to pre-moistened wipes for treating a surface, in particular to a pre-moistened wipe for treating a hard surface. The pre-moistened wipe herein incorporates a substrate and an aqueous composition comprising a polymeric biguanide. The pre-moistened wipe according to the present invention was found to exhibit a superior filming/streaking and shine retention/enhancement profile, as measured using a standard gloss-meter, whilst providing excellent disinfecting and/or antimicrobial benefits.

BACKGROUND OF THE INVENTION

Wipes for treating surfaces are typically pre-moistened, disposable towelettes which may be utilised in a variety of applications both domestic and industrial and perform a variety of functions. Pre-moistened wipes are typically used to wipe surfaces both animate and inanimate, and may provide numerous benefits such as cleaning, cleansing, and disinfecting. Pre-moistened wipes incorporating a cleaning composition are already known in the art. For example, WO 89/05114 discloses disposable, pre-moistened wipes for hard surface cleaning, which are impregnated with a liquid composition. Pre-moistened wipes can also be found in the form of laminates. In one such embodiment, the laminates include a floor sheet attached to a reservoir, as described in WO 2000-2000US26401, incorporated herein by reference.

One particular application for pre-moistened wipes is treating hard surfaces, such as, kitchen and bathroom surfaces, eyeglasses, and surfaces that require cleaning in industry for example surfaces of machinery or automobiles.

A commonly known problem in treating hard surfaces is the formation of films and/or streaks on surfaces treated therewith. Indeed, after the treatment of a hard surface with a pre-moistened wipe, the formation of visible residues (streaks) and/or shine reducing films after drying can often be observed.

Furthermore, the addition of an antimicrobial agent, to compositions intended to wipe and clean surfaces, increases the tendency of filming/streaking on said hard. The filming/streaking is particularly problematic when treating glossy surfaces, such as porcelain, chrome and other shiny metallic surfaces, tiles etc.

It is therefore an object of this invention to provide a pre-moistened wipe composition that shows a disinfecting or antimicrobial benefit and a filming/streaking performance benefit (low or substantially no formation of streak- and/or film-formation).

It has now been found that the above objectives can be met by a pre-moistened wipe for treating a surface, said pre-moistened wipe comprising: (a) a substrate; wherein said substrate is substantially free of a binder or latex; and (b) an aqueous composition applied to said substrate said composition having (i) a pH of about 7 or less and comprising (ii) at least one surfactant; and (iii) a polymeric biguanide.

It is an advantage of the compositions of this invention that judicious choice of surfactant and pH can result in an enhancement of tile gloss, either relative to clean untreated tiles, or tiles treated with a base composition that lacks the antimicrobial agent.

It is another advantage of the invention that the preferred selection of a substrate comprising at least about 20% synthetic fibers can be used to provide improved cleaning properties over a range of soils, including greasy stains and soap scum.

It is yet another advantage of the compositions of this invention that the pre-moistened wipes can optionally be attached to a cleaning implement such as a unit comprising a pole and a mop head.

Additionally, the antimicrobial compositions herein can be used to treat shiny and matt hard-surfaces made of a variety of materials like glazed and non-glazed ceramic tiles, vinyl, no-wax vinyl, linoleum, melamine, glass, plastics, plastified wood.

BACKGROUND ART

Aqueous compositions comprising polymeric biguanides are known in the art. For example, WO 98/56253 discloses a composition comprising a carrier and a polymeric biguanide compound in the form of its salt with an organic acid containing from 4 to 30 carbon atoms such as poly (hexamethylene biguanide) stearate. These compositions comprising poly (hexamethylene biguanide) exhibit high antimicrobial, especially antibacterial activity, and exhibit increased solubility in organic media, especially organic liquids. U.S. Pat. No. 5,141,803 discloses compositions for use in hard surfaces comprising biguanide compounds. EP 0 185 970 describes liquid disinfectant preparations for use on hard surfaces comprising specific oligo-hexamethyl biguanides, specific microbiocidally active phenolic compounds and, optionally builders. U.S. Pat. No. 6,045,817 discloses an antibacterial cleaning composition ($pH \geqq 7.5$) comprising (1) 0.05%-1% of a cationic polymer having a charge density of 0.0015 or higher, (2) 0.2-5% of a zwitterionic surfactant, and (3) 0.2-5% of a biguanide compound.

Pre-moistened wipes comprising antimicrobial actives are known in the art. For example, WO 00/00106 discloses a method for obtaining effective residual antimicrobial activity on hard surfaces with an antimicrobial composition that comprises an organic acid and a surfactant. WO 97/16066 discloses homogeneous antimicrobial compositions and antimicrobial wet wipes and lotions that include the antimicrobial compositions. The antimicrobial composition includes at least 50% water and an effective amount of a hydrophobic antimicrobial agent.

Wipes containing biguanide agents are also disclosed in the patent literature: U.S. Pat. No. 5,993,840 discloses a composition comprising a cellulosic non-woven material containing a mixture of polymeric biguanides, such as poly (hexamethylene biguanide) together with an anionic polymer such as polyacrylic acid super-absorbent.

SUMMARY OF THE INVENTION

The present invention relates to a pre-moistened wipe for treating a surface, said pre-moistened wipe comprising: (a) a substrate; wherein said substrate is substantially free of a binder or latex material; and (b) an aqueous composition applied to said substrate or used in conjunction with said disposable cleaning pad, said composition having (i) a pH of about 7 or less, and comprising (ii) at least one surfactant; and (iii) a polymeric biguanide. The compositions simultaneously deliver excellent filming/streaking properties on a variety of hard surfaces and high biocidal effectiveness against relevant Gram positive and Gram negative organisms found in consumer homes, public domains, and commercial establishments.

Accordingly, the pre-moistened wipe compositions of the present invention are preferably used for wiping and cleaning various surfaces, preferably hard surfaces.

DETAILED DESCRIPTION OF THE INVENTION

Definitions

By 'substrate' or 'wipe' it is meant any woven or nonwoven material formed as a single structure during the manufacturing, or present in the form of two or more material laminates.

By 'pre-moistened wipe' it is meant herein a substrate and an aqueous composition as described herein applied to said substrate.

By 'synthetic material' or 'synthetic fibers', it is meant herein a hydrophobic material based on synthetic organic polymers.

By 'binder' or 'latex', it is meant any additive or treatment intended to provide strength, integrity, cohesion, or adhesion of fibers in a web and in process. The term includes fiber finishes that can be removed by soaking the web in an aqueous composition comprising either glycol ether solvents and/or C2-C4 alcohols.

By 'substantially free of a binder or latex material' it is meant herein that the substrate comprises less than about 10%, preferably less than about 5%, more preferably less than about 1%, still more preferably less than about 0.5%, and most preferably, no binder or latex material.

Substrate

The substrate herein can be made of synthetic or non-synthetic fibers. Synthetic materials, as used herein, include all polymers derived from polyethylene, polypropylene, polyester polymers and mixtures thereof.

The composition of the substrate can vary from 100% synthetic to 100% non-synthetic. While substrates with high synthetic content tend to release more aqueous lotion, the Applicant has found that the compositions of the present invention substantially or completely prevent the increased filming and streaking that is expected to result from increased solution release on hard surfaces. As a result, increased load factors can be used without concern.

In a preferred embodiment, the substrate herein is made of from at least about 20%, preferably at least about 30%, even more preferably at least about 35%, still more preferably at least about 40%, yet still more preferably at least about 50% and most preferably at least about 60% synthetic material.

In another preferred embodiment, the substrate herein is made of up to about 95%, preferably up to about 90%, even more preferably up to about 85%, still more preferably up to about 80%, yet still more preferably up to about 75% and most preferably up to about 70% synthetic material.

Preferably, the synthetic material herein is selected from the group consisting of polyethylene, polyethylene terephthalate, polypropylene, and polyester and mixtures thereof. More preferably, the synthetic material herein is selected from the group consisting of polyethylene, polypropylene, polyester and mixtures thereof. Most preferably, the synthetic material herein is polypropylene or polyester.

Furthermore, the substrate herein may comprise any amount of non-synthetic material. In a preferred embodiment, the substrate herein is made of from 0% to about 80%, more preferably about 5% to about 75%, even more preferably about 10% to about 70% still more preferably about 10% to about 65% and most preferably about 20% to about 60% non-synthetic material.

The distribution of synthetic and non-synthetic fibers within the substrate web can be homogeneous or non-homogeneous. When the distribution of fibers is non-homogeneous, it is preferred that the exposed (top and bottom) surface areas of the wipes comprise a higher amount of synthetic fiber than is present in the overall substrate composition. Such a structure keeps a reservoir of fluid within the more absorbent non-synthetic structure, and sandwiched between the two areas of the wipe that are more hydrophobic; this results in more controlled release of the aqueous composition and better overall mileage for the wipe. Alternatively, the distribution of fibers can advantageously be made so that only one face of the substrate has more hydrophobic fibers than that of the overall composition. In this case, the substrate would be sided, providing one smooth surface with increased synthetic content, and a more draggy surface made of cellulose or treated cellulose derivatives. The presence of increased hydrophobic material at the surface(s) of the substrate also is shown to improve the lubricity or glide of the substrate as it is wiped across a variety of hard surfaces. This can provide reassurance of "easy cleaning" in the context of a consumer goods product.

Whilst it is found that filming and/or streaking results do not depend on the specific amounts of synthetic and non-synthetic materials, the Applicant has found that in a particularly preferred embodiment, additional cleaning benefits can be achieved when the substrate comprises at least about 20% synthetic fibers. Even higher levels of synthetic fibers can be advantageous for further cleaning benefits.

Whilst not being bound by theory, it is believed that hydrophobic-hydrophobic interactions between substrate and soil account for improved removal of greasy soils. Thus, saturated and unsaturated oils, fatty acids, oxidized oils and polymerized grease are all removed with enhanced ease and thoroughness by a wipe that compositionally has a significant synthetic component. Further, the benefits of the synthetic component of the substrate go beyond just the cleaning of pure greasy stains. It is found that the hydrophobic component of the substrate increases removal of complex soils in which the oils or other greasy components are present even if they represent minority components of the overall soil mixture. In this respect, the use of substrate comprising at least about 20% synthetic component is advantageous for the cleaning of common soils that occur in kitchens, bathrooms and elsewhere in consumers' homes including floors.

Suitable non-synthetic materials are man-made fibers and natural fibers. The term man-made fiber, as used herein, denotes fibers manufactured from cellulose, either derivative or regenerated. They are distinguished from synthetic fibers, which are based on synthetic organic polymers. A derivative fiber, as used herein, is one formed when a chemical derivative of a natural polymer, e.g., cellulose, is prepared, dissolved, and extruded as a continuous filament, and the chemical nature of the derivative is retained after the fiber formation process. A regenerated fiber, as used herein, is one formed when a natural polymer, or its chemical derivative, is dissolved and extruded as a continuous filament, and the chemical nature of the natural polymer is either retained or regenerated after the fiber formation process. Typical examples of man made fibers include: regenerated viscose rayon and cellulose acetate. Preferred man-made fibers have a fineness of about 0.5 dtex to about 3.0 dtex, more preferably of about 1.0 dtex to about 2.0 dtex, most preferably of about 1.6 dtex to about 1.8 dtex.

Suitable, natural fibers are selected from the group consisting of wood pulp, cotton, hemp, and the like. Man-made fibers are preferred herein due to their high consumer acceptance and their cheap and typically ecological production. Importantly, man-made fibers and in particular cellulose derived man-made fibers exhibit a high biodegradability, hence are environment friendly after disposal. Natural fibers can be preferred because they do not require the modifications needed to create the man-made fibers. As such natural fibers can provide cost advantages.

In a preferred embodiment according to the present invention, the man-made fiber for use in the substrate herein is a hydrophilic material, such as Tencel®D rayon, Lenzing AG rayon®, micro-denier rayon, and Lyocell®. Hydrophilic man-made fiber material, when at least partially present in the substrate herein, has been found to allow for increased loading factor (described hereinafter) of the aqueous chemical composition applied to the substrate. Indeed, it has been found that a man-made fiber-containing substrate can incorporate more aqueous cleaning composition than a purely synthetic substrate. Furthermore, it has been found that a pre-moistened wipe comprising man-made fiber shows a slower release of the composition impregnated thereon during use as compared to a purely synthetic substrate. By slower releasing said composition, the area that can be treated with the pre-moistened wipe is significantly increased. Additionally, the slower release ensures improved even-ness of solution distribution and coverage over the surfaces treated.

Suitable, man-made fibers are commercially available under the trade name Lyocell® fibers that are produced by dissolving cellulose fibers in N-methylmorpholine-N-oxide and which are supplied by Tencel Fibers Europe, UK.

Preferred man made fibers used for the present invention are selected from the group consisting of viscose rayon, high absorbency rayon, Tencel® rayon, Lenzing AG rayon® and mixtures thereof. It is understood that the specific choice of rayon type will depend on the desired cleaning and absorbency characteristics and associated costs. More preferably, the man made fibers used for the present invention are selected from the group consisting of viscose rayon and high absorbency rayon.

The substrate herein is provided in the form of a web, typically as a sheet of material cut from the web. Said web may be made of the sheets of material from which the wipes are produced, preferably cut. The web may be woven or non-woven, comprising either synthetic, non-synthetic material, or mixtures of synthetic and non-synthetic material; in a preferred embodiment, the web is a non-woven comprising at least 20% synthetic material.

According to the present invention, the sheet may be produced by any method known in the art. For example non-woven material substrates can be formed by dry forming techniques such as air-laying or wet laying such as on a papermaking machine. Other non-woven manufacturing techniques such as hydroentangling, melt blown, spun bonded, needle punched and methods may also be used. However, the substrate must be made substantially free of binder of latex. Many manufacturing techniques, such as air-laying, do not lend themselves to the formation of binder- and latex-free substrates. As such they are not preferred manufacturing techniques.

The substrate preferably has a weight of from about 20 $gm^{-2}$ to about 200 $gm^{-2}$. More preferably, the substrate has a weight of at least about 20 $gm^{-2}$ and more preferably less than about 150 $gm^{-2}$, more preferably the base weight is in the range of about 20 $gm^{-2}$ to about 120 $gm^{-2}$, and most preferably from about 30 $gm^{-2}$ to about 110 $gm^{-2}$. The substrate may have any caliper. Typically, when the substrate is made by hydroentangling, the average substrate caliper is less than about 1.2 mm at a pressure of about 0.1 pounds per square inch. More preferably the average caliper of the substrate is from about 0.1 mm to about 1.0 mm at a pressure of about 0.1 pounds per square inch (about 0.007 kilograms per square meter). The substrate caliper is measured according to standard EDANA nonwoven industry methodology, reference method # 30.4-89.

In addition to the fibers used to make the substrate, the substrate can comprise other components or materials added thereto as known in the art, including opacifying agents, for example titanium dioxide, to improve the optical characteristics of the substrate.

The substrate herein is substantially free, preferably free, of a binder or latex material. Preferably, that substrate herein is substantially free, preferably free, of a binder and latex material. Substantial elimination of binders and latexes, and the like, can be accomplished by pre-washing the dry substrate in soft, distilled or de-ionized water or other solvents, or by using a process, such as hydroentangling. More specifically, in the hydroentangling process, a fibrous web is exposed subjected to high-velocity water jets, preferably employing de-ionized, distilled or soft water that entangle the fibers. The non-woven material may then be subjected to conventional drying and wind-up operations, as known to those skilled in the art. Since the hydroentangling process precludes the use of binders, and can be used to wash off fiber latexes, it is the most preferred process to be used in the manufacture of substrates of the present invention.

According to a preferred embodiment of the present invention the pre-moistened wipe comprises a substrate with a composition as described herein applied thereon. By "applied" it is meant herein that said substrate is coated or impregnated with a liquid composition as described herein.

In preparing pre-moistened wipes according to the present invention, the composition is applied to at least one surface of the substrate material. The composition can be applied at any time during the manufacture of the pre-moistened wipe. Preferably the composition can be applied to the substrate after the substrate has been dried. Any variety of application methods that evenly distribute lubricious materials having a molten or liquid consistency can be used. Suitable methods include spraying, printing, (e.g. flexographic printing), coating (e.g. gravure coating or flood coating) extrusion whereby the composition is forced through tubes in contact with the substrate whilst the substrate passes across the tube or combinations of these application techniques. For example spraying the composition on a rotating surface such as calender roll that then transfers the composition to the surface of the substrate. The composition can be applied either to one surface of the substrate or both surfaces, preferably both surfaces. The preferred application method is extrusion coating.

The composition can also be applied uniformly or non-uniformly to the surfaces of the substrate. By non-uniform it is meant that for example the amount, pattern of distribution of the composition can vary over the surface of the substrate. For example some of the surface of the substrate can have greater or lesser amounts of composition, including portions of the surface that do not have any composition on it. Preferably however the composition is uniformly applied to the surfaces of the wipes.

Preferably, the composition can be applied to the substrate at any point after it has been dried. For example the composition can be applied to the substrate prior to calendering or after calendering and prior to being wound up onto a parent roll. Typically, the application will be carried out on a substrate unwound from a roll having a width equal to a substantial number of wipes it is intended to produce. The substrate with the composition applied thereto is then subsequently perforated utilizing standard techniques in order to produce the desired perforation line.

The composition is typically applied in an amount of from about 1 g to about 10 g per gram of substrate (load factor=about 1-about 10×), preferably from about 1.5 g to about 8.5 g per gram of substrate, most preferably from about 2 g to about 7 g per gram of dry substrate. One of the benefits associated with the pre-moistened wipes of the present invention is that high load factors can be used without significantly compromising filming and/or streaking results, in part, because the substrate does not contribute to filming and streaking issues. Those skilled in the art will recognize that the exact amount of aqueous composition applied to the substrate will depend on the basis weight of the substrate and on the end use of the product. In one preferred embodiment, a relatively low basis weight substrate, from about 20 $gm^{-2}$ to about 80 $gm^{-2}$ is used in the making of a pre-moistened wipe suitable for cleaning counters, stove tops, cabinetry, walls, sinks and the like. For such end uses, the dry substrate is loaded with an aqueous composition of the invention at a factor of from about 4 grams to about 10 grams per gram of dry substrate. In another preferred embodiment, a higher basis substrate, from about 70 $gm^{-2}$ to about 200 $gm^{-2}$ is used in the making of the pre-moistened wipe suitable for cleaning larger area surfaces, including floors, walls and the like. In such instances, the wipe is preferably sold with, or designed to work with, a hand held implement comprising a handle and designed for wiping and cleaning. Examples of such implements are commercially available under the trade names Swiffer®, Grab-Its® and Vileda®. For such end uses, the dry substrate is loaded with an aqueous composition of the invention at a factor of from about 4 grams to about 10 grams per gram of dry substrate.

Suitable substrates are commercially available under the trade names DuPont 8838®, Kimberly Clark Hydroknit® or Fibrella 3160® (Suominen). These substrates use a combination of homogeneously distributed synthetic and natural fibers and use the preferred hydroentangling process. Substrates manufactured by alternative processes can also be used, provided they are first made to be substantially free of binders, latexes and fiber finishes.

Aqueous Composition

The composition of the present invention is formulated as a liquid composition. A preferred composition herein is an aqueous composition and therefore, preferably comprises water more preferably in an amount of from about 60% to about 99%, even more preferably of from about 70% to about 98% and most preferably about 80% to about 97% by weight of the total composition.

The aqueous compositions of the present invention have a pH of about 7 or less and at least one surfactant so as to lower the contact angle between the compositions and relevant hard surfaces, thereby assisting the wetting of such surfaces. The compositions also include a polymeric biguanide compound, which in the presence of the surfactant, acts as a hydrophilic wetting agent and preferably as an antimicrobial compound. In a preferred embodiment, the surfactant is a low residue surfactant, as further described herein. In another highly preferred embodiment, the aqueous compositions also comprise at least one water-soluble solvent with a vapour pressure of greater than about 0.05 mm Hg at 1 atmosphere pressure (about 6.66 Pa).

The solids content of the aqueous compositions of the present invention is generally low, preferably from about 0.01% to about 4%, more preferably from about 0.05% to about 3%, most preferably from about 0.10% to about 2.0%. Those skilled in the art will recognize that the aqueous compositions of the present invention can be made in the form of about 5×, about 10×, or even higher concentrates as desired, and then diluted prior use. The making of concentrated solutions is particularly beneficial if the aqueous composition must be transported.

Composition pH

The aqueous compositions have a pH of about 7 or less. It is found that the filming and streaking benefits are not observed, or are substantially attenuated, at a pH higher than about 7. The pH measurement is performed by pre-loading the aqueous composition onto the substrate, allowing the substrate and lotion to equilibrate at ambient conditions for at least 48 hours, more preferably at least 72 hours, expressing out the aqueous composition from the substrate and then running the pH measurement on the freed up aqueous solution. The Applicant has found that a pH of about 7 or less is an essential component needed to achieve good filming/streaking benefits in the presence of the polymeric biguanide compound. The pH range of the compositions measured by squeezing out aqueous solution from the pre-moistened wipes, is preferably from about 0.5 to about 6.5, more preferably from pH about 1.0 to about 6, more preferably from pH about 2 to about 5.5, and most preferably from pH about 2.5 to about 5.

In one preferred embodiment, the aqueous composition has a pH of from pH about 5 to about pH 7 and does not include an acidifying agent. In this embodiment the benefits of the invention are most noteworthy when the substrate comprises at least about 50% synthetic content and the aqueous composition comprises at least one surfactant selected from the group consisting of C8-16 poly alkyl glycosides.

Acidifying Agent

In the preferred embodiment wherein the aqueous composition herein comprises at least one acidifying agent, the pH range of the compositions measured by squeezing out aqueous solution from the pre-moistened wipes, is preferably from about 0.5 to about 7, more preferably from pH about 1.0 to about 6, more preferably from pH about 2 to about 5.5, and most preferably from pH about 2.5 to about 5. A suitable acid for use herein is an organic and/or an inorganic acid, most preferably an organic acid. Suitable organic acids are monomeric, oligomeric or polymeric organic acids.

Examples of a suitable organic acids include acetic acid, glycolic acid, lactic acid, succinic acid, adipic acid, malic acid, tartaric acid, lactic acid, polyacrylic acid, poly-aspartic acid, and the like. Highly preferred organic acids are selected from the group consisting of succinic acid, glutaric acid, adipic acid, lactic acid, tartaric acid and citric acid. For cost, availability, buffering capacity and regulatory reasons, citric acid (food grade desired but not required) is most preferred.

A typical level of organic acid, preferably comprising at least one hydroxyl moiety, is from about 0.05% to about 3.0%, preferably from about 0.05% to about 2.0% and more preferably from about 0.1% to about 1.5% by weight of the total aqueous composition. The specific level of acid will depend on the magnitude and type of the benefits sought. Higher levels promote improved cleaning of acid-sensitive soils while lower levels provide better filming streaking. The most preferred levels have been found to provide a combination of adequate buffering capacity, excellent cleaning and good filming/streaking properties. As such, organic acids selected from the group consisting of citric acid, tartaric acid and lactic acid are highly preferred.

In a preferred embodiment, the pre-moistened wipes are to be applied on hard surfaces soiled with hard watermarks, limescale and/or soap scum, and the like. Such soils are frequently encountered on bathroom surfaces. Accordingly, the compositions herein may further comprise acid or base buffers to adjust pH as appropriate.

The Surfactant:

The compositions of the present invention comprise at least one surfactant, which preferably can be non-ionic, anionic, cationic, zwitterionic or amphoteric, and mixtures thereof. The required surfactant is defined as any material with a hydrophobic component consisting of a hydrocarbon moiety with between about 6 carbon atoms about 20 carbon atoms, and a hydrophilic head group. The purpose of the surfactant is improved wetting of the hard surfaces to be treated. The wetting properties of the surfactant are essential to the compositions of the invention. Thus, compositions lacking the requisite surfactant are not found to properly wet the surfaces, leading to the undesirable aggregation of polymeric biguanide on tile.

The hydrophobic tail of the surfactant can be linear or branched, aliphatic aromatic. The hydrophilic head group can consist of any group such that provides wetting properties. Said surfactant may be present in the compositions according to the present invention in amounts of from about 0.01% to about 1.5%, preferably of from about 0.01% to about 1.0%, and more preferably of from about 0.01% to about 0.5% by weight of the total composition.

More specifically, groups of non-ionic surfactants that can be used in the context of the following invention are as follows:

(i) The polyethylene oxide condensates of alkyl phenols, e.g., the condensation products of alkyl phenols having an alkyl group containing from about 6 to about 12 carbon atoms in either a straight chain or branched chain configuration, with ethylene oxide, the said ethylene oxide being present in amounts equal to about 10 to about 25 moles of ethylene oxide per mole of alkyl phenol. The alkyl substituent in such compounds may be derived from polymerized propylene, diisobutylene, octane, and nonane.

(ii) Those derived from the condensation of ethylene oxide with the product resulting from the reaction of propylene oxide and ethylene diamine products, which may be varied, in composition depending upon the balance between the hydrophobic and hydrophilic elements, which is desired. Examples are to increase the water-solubility of the molecule as a whole and the liquid character of the products is retained up to the point where polyoxyethylene content is about 50% of the total weight of the condensation product; compounds containing from about 40% to about 80% polyoxyethylene by weight and having a molecular weight of from about 5000 to about 11000 resulting from the reaction of ethylene oxide groups with a hydrophobic base constituted of the reaction product of ethylene diamine and excess propylene oxide, said base having a molecular weight of the order of about 2500 to about 3000.

(iii) The condensation product of aliphatic alcohols having from about 6 to about 18 carbon atoms, in either straight chain or branched chain configuration, with ethylene oxide, propylene oxide, butylene oxide, and mixtures thereof, e.g., a coconut alcohol ethylene oxide condensate having from about 3 to about 15 moles of ethylene oxide per mole of coconut alcohol, the coconut alcohol fraction having from about 10 to about 14 carbon atoms; such materials are commonly known as 'alkyl alkoxylates' or 'alcohol alkoxylates'. In some cases, an alkyl ethoxylates can have capping groups, meaning that they have the structure $R1\text{-}(EO)_xR2$, where R1 is a C6-C18 linear or branched moiety, x is from about 1 to about 15 and R2, the capping group, is a C1-C8 hydrocarbyl moiety.

(iv) Trialkyl amine oxides and trialkyl phosphine oxides wherein one alkyl group ranges from about 10 to about 18 carbon atoms and two alkyl groups range from about 1 to about 3 carbon atoms; the alkyl groups can contain hydroxy substituents; specific examples are dodecyl di(2-hydroxyethyl)amine oxide and tetradecyl dimethyl phosphine oxide.

Although not preferred, the condensation products of ethylene oxide with a hydrophobic base formed by the condensation of propylene oxide with propylene glycol are also suitable for use herein. The hydrophobic portion of these compounds will preferably have a molecular weight of from about 1500 to about 1800 and will exhibit water insolubility. The addition of polyoxyethylene moieties to this hydrophobic portion tends to increase the water solubility of the molecule as a whole, and the liquid character of the product is retained up to the point where the polyoxyethylene content is about 50% of the total weight of the condensation product, which corresponds to condensation with up to about 40 moles of ethylene oxide. Examples of compounds of this type include certain of the commercially available Pluronic® surfactants, marketed by BASF. Chemically, such surfactants have the structure $(EO)_x(PO)_y(EO)_z$ or $(PO)_x(EO)_y(PO)_z$ wherein x, y and z are from about 1 to about 100, preferably about 3 to about 50. Pluronic® surfactants known to be good wetting surfactants are more preferred. A description of the Pluronic® surfactants, and properties thereof, including wetting properties, can be found in the brochure entitled BASF Performance Chemicals Plutonic® & Tetronic® Surfactants", available from BASF and incorporated herein by reference.

Also not preferred, although suitable as non-ionic surfactants herein are the condensation products of ethylene oxide with the product resulting from the reaction of propylene oxide and ethylenediamine. The hydrophobic moiety of these products consists of the reaction product of ethylenediamine and excess propylene oxide, and generally has a molecular weight of from about 2,500 to about 3,000. This hydrophobic moiety is condensed with ethylene oxide to the extent that the condensation product contains from about 40% to about 80% by weight of polyoxyethylene and has a molecular weight of from about 5,000 to about 11,000. Examples of this type of non-ionic surfactant include certain of the commercially available Tetronic® compounds, marketed by BASF.

Other non-ionic surfactants, though not preferred, for use herein include polyhydroxy fatty acid amides of the structural formula:

(I)

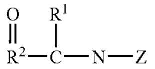

wherein: $R^1$ is H, C1-C4 hydrocarbyl, 2-hydroxy ethyl, 2-hydroxypropyl, or a mixture thereof, preferably $C_1$-$C_4$ alkyl, more preferably C1 or C2 alkyl, most preferably C1 alkyl (i.e., methyl); and $R^2$ is a C5-C31 hydrocarbyl, preferably straight chain C7-C19 alkyl or alkenyl, more preferably straight chain C9-C17 alkyl or alkenyl, most preferably straight chain C11-C17 alkyl or alkenyl, or mixtures thereof; and Z is a polyhydroxyhydrocarbyl having a linear hydrocarbyl chain with at least about 3 hydroxyls directly connected to the chain, or an alkoxylated derivative (preferably ethoxylated or propoxylated) thereof. Z preferably will be derived from a reducing sugar in a reductive amination reaction; more preferably Z is a glycityl. Suitable reducing sugars include glucose, fructose, maltose, lactose, galactose, mannose, and xylose. As raw materials, high dextrose corn syrup can be utilised as well as the individual sugars listed above. These corn syrups may yield a mix of sugar components for Z. It should be understood that it is by no means intended to exclude other suitable raw materials. Z preferably will be selected from the group consisting of $—CH_2—(CHOH)_n—CH_2OH$, $—CH(CH_2OH)—(CHOH)_{n-1}—CH_2OH$, $—CH_2—(CHOH)_2(CHOR')(CHOH)—CH_2OH$, where n is an integer from about 3 to about 5, inclusive, and R' is H or a cyclic or aliphatic monosaccharide, and alkoxylated derivatives thereof. Most preferred are glycityls wherein n is 4, particularly $—CH_2—(CHOH)_4—CH_2OH$.

In Formula (I), $R^1$ can be, for example, N-methyl, N-ethyl, N-propyl, N-isopropyl, N-butyl, N-2-hydroxy ethyl, or N-2-hydroxy propyl. $R^2—CO—N<$ can be, for example, cocamide, stearamide, oleamide, lauramide, myristamide, capricamide, palmitamide, tallowamide, etc. Z can be 1-deoxyglucityl, 2-deoxyfructityl, 1-deoxymaltityl, 1-deoxylactityl, 1-deoxygalactityl, 1-deoxymannityl, 1-deoxymaltotriotityl, etc.

Another type of suitable non-ionic surfactants for use herein are the 2-alkyl alkanols having an alkyl chain comprising from about 6 to about 16, preferably from about 7 to about 13, more preferably from about 8 to about 12, most preferably from about 8 to about 10 carbon atoms and a terminal hydroxy group, said alkyl chain being substituted in the (x position (i.e., position number 2) by an alkyl chain comprising from about 1 to about 10, preferably from about 2 to about 8 and more preferably about 4 to about 6 carbon atoms.

Such suitable compounds are commercially available, for instance, as the Isofol® series such as Isofol® 12 (2-butyl octanol) or Isofol® 16 (2-hexyl decanol) commercially available from Condea.

Another type of suitable non-ionic surfactants for use herein are the 2-alkyl alkanols having an alkyl chain comprising from about 6 to about 16, preferably from about 7 to about 13, more preferably from about 8 to about 12, most preferably from about 8 to about 10 carbon atoms and a terminal hydroxy group, said alkyl chain being substituted in the (X position (i.e., position number 2) by an alkyl chain comprising from about 1 to about 10, preferably from about 2 to about 8 and more preferably about 4 to about 6 carbon atoms.

Such suitable compounds are commercially available, for instance, as the Isofol® series such as Isofol® 12 (2-butyl octanol) or Isofol® 16 (2-hexyl decanol) commercially available from Condea.

A detailed listing of suitable non-ionic surfactants useful in this invention can be found in U.S. Pat. No. 4,557,853, Collins, issued Dec. 10, 1985 and incorporated herein by reference.

Among non-low residue non-ionic surfactants, those formed by the reaction of an alcohol with one or more ethylene oxides, are most preferred. These surfactants are prone to form highly visible films in the absence of polymeric biguanides. However, the Applicant has found that addition of low to moderate levels (e.g., 0.05%-0.30%) of the biguanides of the invention to compositions results in significant toning of the visible film, and leads to enhanced gloss on tile that is aesthetically pleasing. In effect, the polymeric biguanides of the invention are effective and efficient in removing alkyl ethoxylate-produced visible films from tiles. Non-limiting examples of groups of these preferred non-low residue alkyl alkoxylates include Neodol® surfactants (Shell), Tergitol® surfactants (Union Carbide) and Icconol® surfactants (BASF). One specific example is Neodol 91-6®, an alkyl ethoxylate comprising from 9 to 11 carbon atoms and an average of 6 moles of ethoxylation, made by Shell.

Anionic surfactants are not preferred in the present invention, particularly as primary surfactants, but can also be used. Suitable anionic surfactants for use herein include alkali metal (e.g., sodium or potassium) fatty acids, or soaps thereof, containing from about 8 to about 24, preferably from about 10 to about 20 carbon atoms, linear of branched C6-C16 alcohols, C6-C12 alkyl sulfonates, C6-C18 alkyl sulfates 2-ethyl-hexyl sulfosuccinate, C6-C16 alkyl carboxylates, C6-C18 alkyl ethoxy sulfates.

The fatty acids including those used in making the soaps can be obtained from natural sources such as, for instance, plant or animal-derived glycerides (e.g., palm oil, coconut oil, babassu oil, soybean oil, castor oil, tallow, whale oil, fish oil, tallow, grease, lard and mixtures thereof). The fatty acids can also be synthetically prepared (e.g., by oxidation of petroleum stocks or by the Fischer-Tropsch process). Alkali metal soaps can be made by direct soapification of fats and oils or by the neutralization of the free fatty acids which are prepared in a separate manufacturing process. Particularly useful are the sodium and potassium salts of the mixtures of fatty acids derived from coconut oil and tallow, i.e., sodium and potassium tallow and coconut soaps.

Other suitable anionic surfactants for use herein include water-soluble salts, particularly the alkali metal salts, of organic sulphuric reaction products having in the molecular structure an alkyl radical containing from about 8 to about 22 carbon atoms and a radical selected from the group consisting of sulfonic acid and sulphuric acid ester radicals. Important examples of these synthetic detergents are the sodium, ammonium or potassium alkyl sulfates, especially those obtained by sulphating the higher alcohols produced by reducing the glycerides of tallow or coconut oil; sodium or potassium alkyl benzene sulfonates, in which the alkyl group contains from about 9 to about 15 carbon atoms, especially those of the types described in U.S. Pat. Nos. 2,220,099 and 2,477,383, incorporated herein by reference; sodium alkyl glyceryl ether sulfonates, especially those ethers of the higher alcohols derived from tallow and coconut oil; sodium coconut oil fatty acid monoglyceride sulfates and sulfonates; sodium or potassium salts of sulfuric acid esters of the reaction product of one mole of a higher fatty alcohol (e.g., tallow or coconut oil alcohols) and about three moles of ethylene oxide; sodium or potassium salts of alkyl phenol ethylene oxide ether sulfates with about four units of ethylene oxide per molecule and in which the alkyl radicals contain about 9 carbon atoms; sodium or potassium salts of alkyl ethylene oxide ether sulfates with about four units of ethylene oxide per molecule and in which the alkyl radicals contain 6 to 18 carbon atoms; the reaction product of fatty acids esterified with isothionic acid and neutralized with sodium hydroxide where, for example, the fatty acids are derived from coconut oil; sodium or potassium salts of fatty acid amide of a methyl taurine in which the fatty acids, for example, are derived from coconut oil; and others known in the art, a number being specifically set forth in U.S. Pat. Nos. 2,486,921, 2,486,922 and 2,396,278, incorporated herein by reference. Other suitable anionic surfactants include C6-C18 alkyl ethoxy carboxylates, C8-C18 methyl ester sulfonates, 2-ethyl-1-hexyl sulfosuccinamate, 2-ethyl-1-hexyl sulfosuccinate and the like.

Cationic surfactants are not preferred but can be used at low levels in compositions of the present invention are those having a long-chain hydrocarbyl group. Examples of such cationic surfactants include the ammonium surfactants such as alkyldimethylammonium halogenides, and those surfactants having the formula:

$$[R^2(OR^3)_y][R^4(OR^3)_y]_2R^5N^+X^-$$

wherein $R^2$ is an alkyl or alkyl benzyl group having from about 8 to about 18 carbon atoms in the alkyl chain, each $R^3$ is selected from the group consisting of $—CH_2CH_2—$, $—CH_2CH(CH_3)—$, $—CH_2CH(CH_2OH)—$, $—CH_2CH_2CH_2—$, and mixtures thereof; each $R^4$ is selected from the group consisting of $C_1$-$C_4$ alkyl, $C_1$-$C_4$ hydroxyalkyl, benzyl ring structures formed by joining the two $R^4$ groups, $—CH_2CHOH—CHOHCOR^6CHOHCH_2OH$ wherein $R^6$ is any hexose or hexose polymer having a molecular weight less than about 1000, and hydrogen when y is not 0; $R^5$ is the same as $R^4$ or is an alkyl chain wherein the total number of carbon atoms of $R^2$ plus $R^5$ is not more than about 18; each y is from 0 to about 10 and the sum of the y values is from 0 to about 15; and X is any compatible anion.

Other cationic surfactants useful herein are also described in U.S. Pat. No. 4,228,044, Cambre, issued Oct. 14, 1980, incorporated herein by reference.

Zwitterionic surfactants, as defined herein, are surface-active agents that comprise at least one cationic group and at least one anionic group on the same molecule. This class of surfactants is described in greater detail in the section entitled low residue surfactants. Amphoteric surfactants, as defined herein, are surface-active agents similar to zwitterionic surfactants. They differ in that the do not include a cationic group, but rather an amine group that becomes cationic, i.e., protonated, at low pH (below 5.5). Amphoteric surfactants are also described in greater detail in the section entitled low residue surfactants. A good commercial source of all the surfactants described above can be found in McCutcheon's EMULSIFIERS AND DETERGENTS, North American Edition and International editions, 2001, McCutcheon Division, MC Publishing Company, also incorporated herein by reference.

Low-Residue Surfactant:

In a particularly preferred embodiment, the composition applied to the pre-moistened wipes according to the present invention comprises a low-residue surfactant or a mixture thereof. By "low-residue surfactant" it is meant herein any surfactant that mitigates the appearance of either streaks or films upon evaporation of the aqueous compositions comprising said surfactant. A low residue surfactant-containing composition may be identified using either gloss-meter readings or expert visual grade readings, and running tests on compositions not comprising the essential polymeric biguanide. The conditions for the determination of what constitutes a low-residue surfactant are one of the following: (a) less than about 1.5% gloss loss on black shiny porcelain tiles, preferably on black Extracompa® shiny porcelain tiles used in this invention; or (b) lack of significant filming and/streaking as judged by one skilled in the art. One of the important advantages of the low-residue surfactant is that it requires less polymeric biguanide compound for gloss enhancement, relative to non-low residue surfactants. This can be important in light of cost considerations, potential stickiness issues delivered by higher concentrations of the polymeric biguanide, and/or concerns over the ability to completely strip a more concentrated polymeric biguanide film.

Whilst not wishing to be limited by theory, it is believed that low residue surfactants exhibit a reduced tendency for inter-molecular aggregation. With less aggregation of surfactant molecules to form visible macromolecular complexes following evaporation of water from the aqueous compositions, the remaining residue is less visible, resulting in fewer streaks. Unlike conventional non-ionic surfactants such as alkyl ethoxylates and alkyl phenol ethoxylates, which exhibit rich phase chemistry, the "low residue" surfactants do not easily form anisotropic macromolecular structures in water, which helps make the film which they form upon dry-down from solution less visible. Indeed, the residue is observed to be nearly colorless, leading to films that are essentially not visible to the naked eye or in some instances, films that enhance the gloss of the treated tiles.

As identified within this invention there are three classes of low residue surfactants: selected non-ionic surfactants, zwitterionic surfactants and amphoteric surfactants.

One class of low residue surfactants is the group of non-ionic surfactants that include a head group consisting of one or more sugar moieties. Examples include alkyl polyglycosides, especially poly alkyl glucosides, and sucrose esters. The chain length of alkyl polyglycoside surfactants is preferably about C6 to about C18, more preferably from about C8 to about C16. The chain length of the preferred sucrose esters is C16-C22. The hydrophilic component of these surfactants may comprise one or more sugar moieties liked by glycosidic linkages. In a preferred embodiment, the average number of sugar moieties per surfactant chain length is from about 1 to about 3, more preferably from about 1.1 to about 2.2.

The most preferred non-ionic low residue surfactants are the alkylpolysaccharides that are disclosed in U.S. Pat. No. 5,776,872, Cleansing compositions, issued Jul. 7, 1998, to Giret, Michel Joseph; Langlois, Anne; and Duke, Roland Philip; U.S. Pat. No 5,883,059, Three in one ultra mild lathering antibacterial liquid personal cleansing composition, issued Mar. 16, 1999, to Furman, Christopher Allen; Giret, Michel Joseph; and Dunbar, James Charles; etc.; U.S. Pat No. 5,883,062, Manual dishwashing compositions, issued Mar. 16, 1999, to Addison, Michael Crombie; Foley, Peter Robert; and Allsebrook, Andrew Micheal; and U.S. Pat. No. 5,906, 973, issued May 25, 1999, Process for cleaning vertical or inclined hard surfaces, by Ouzounis, Dimitrios and Nierhaus, Wolfgang.

Suitable alkyl polyglucosides for use herein are disclosed in U.S. Pat. No. 4,565,647, Llenado, issued Jan. 21, 1986, having a hydrophobic group containing from about 6 to about 30 carbon atoms, preferably from about 10 to about 16 carbon atoms and polysaccharide, e.g., a polyglycoside, hydrophilic group containing from about 1.3 to about 10, preferably from about 1.3 to about 3, most preferably from about 1.3 to about 2.7 saccharide units. Any reducing saccharide containing 5 or 6 carbon atoms can be used, e.g., glucose, galactose, and galactosyl moieties can be substituted for the glucosyl moieties. (Optionally the hydrophobic group is attached at the 2-, 3-, 4-, etc. positions thus giving a glucose or galactose as opposed to a glucoside or galactoside.). The intersaccharide bonds can be, e.g., between the one position of the additional saccharide units and the 2-, 3-, 4-, and/or 6-positions of the preceding saccharide units. The glycosyl is preferably derived from glucose.

Optionally, there can be a polyalkyleneoxide chain joining the hydrophobic moiety and the polysaccharide moiety. The preferred alkyleneoxide is ethylene oxide. Typical hydrophobic groups include alkyl groups, either saturated or unsaturated, branched or unbranched containing from about 8 to about 18, preferably from about 10 to about 16, carbon atoms. Preferably, the alkyl group can contain up to about 3 hydroxy groups and/or the polyalkyleneoxide chain can contain up to about 10, preferably less than 5, alkyleneoxide moieties. Suitable alkyl polysaccharides are octyl, nonyldecyl, undecyldodecyl, tridecyl, tetradecyl, pentadecyl, hexadecyl, heptadecyl, and octadecyl, di-, tri-, tetra-, penta-, and hexaglucosides, galactosides, lactosides, glucoses, fructosides, fructoses and/or galactoses. Suitable mixtures include coconut alkyl, di-, tri-, tetra-, and pentaglucosides and tallow alkyl tetra-, penta-, and hexaglucosides.

The preferred alkylpolyglycosides have the formula:

$$R^2O(C_nH_{2n}O)_t(\text{glucosyl})_x$$

wherein $R^2$ is selected from the group consisting of alkyl, alkylphenyl, hydroxyalkyl, hydroxyalkylphenyl, and mixtures thereof in which the alkyl groups contain from about 10 to about 18, preferably from about 12 to about 14, carbon atoms; n is 2 or 3, preferably 2; t is from 0 to about 10, preferably 0; and x is from about 1.3 to about 10, preferably from about 1.3 to about 3, most preferably from about 1.3 to about 2.7. The glycosyl is preferably derived from glucose. To prepare these compounds, the alcohol or alkylpolyethoxy alcohol is formed first and then reacted with glucose, or a source of glucose, to form the glucoside (attachment at the 1-position). The additional glycosyl units can then be attached between their 1-position and the preceding glycosyl units 2-, 3-, 4-and/or 6-position, preferably predominantely the 2-position.

Zwitterionic surfactants represent a second class of highly preferred low-residue surfactants. Zwitterionic surfactants contain both cationic and anionic groups on the same molecule over a wide pH range. The typical cationic group is a quaternary ammonium group, although other positively charged groups like sulfonium and phosphonium groups can also be used. The typical anionic groups are carboxylates and sulfonates, preferably sulfonates, although other groups like sulfates, phosphates and the like, can be used. Some common examples of these detergents are described in the patent literature: U.S. Pat. Nos. 2,082,275, 2,702,279 and 2,255,082, incorporated herein by reference.

A generic formula for some preferred zwitterionic surfactants is:

$$R—N^+(R^2)(R^3)(R^4)X^-,$$

wherein R is a hydrophobic group,; $R^2$ and $R^3$ are each a C1-4 alkyl hydroxy alkyl or other substituted alkyl group which can be joined to form ring structures with the N; $R^4$ is a moiety joining the cationic nitrogen to the hydrophilic anionic group, and is typically an alkylene, hydroxy alkylene, or polyalkoxyalkylene containing from about one to about four carbon atoms; and X is the hydrophilic group, most preferably a sulfonate group.

Preferred hydrophobic groups R are alkyl groups containing from about 6 to about 20 carbon atoms, preferably less than about 18 carbon atoms. The hydrophobic moieties can optionally contain sites of instauration and/or substituents and/or linking groups such as aryl groups, amido groups, ester groups, etc. In general, the simple alkyl groups are preferred for cost and stability reasons. A specific example of a "simple" zwitterionic surfactant is 3-(N-dodecyl-N,N-dimethyl)-2-hydroxypropane-1-sulfonate available from the Degussa-Goldschmidt Company under the tradename Varion HC®.

Other specific zwitterionic surfactants have the generic formula:

$$R—C(O)—N(R^2)—(CR^3{}_2)_n—N(R^2)_2{}^+—(CR^3{}_2)_n—SO_3^-,$$

wherein each R is a hydrocarbon, e.g., an alkyl group containing from about 6 to about 20, preferably up to about 18, more preferably up to about 16 carbon atoms, each ($R^2$) is either a hydrogen (when attached to the amido nitrogen), short chain alkyl or substituted alkyl containing from about 1 to about 4 carbon atoms, preferably groups selected from the group consisting of methyl, ethyl, propyl, hydroxy substituted ethyl and propyl and mixtures thereof, more preferably methyl, each ($R^3$) is selected from the group consisting of hydrogen and hydroxyl groups, and each n is a number from about 1 to about 4, more preferably about 2 or about 3, most preferably about 3, with no more than about 1 hydroxy group in any ($CR^3{}_2$) moiety. The R group can be linear or branched, saturated or unsaturated. The $R^2$ groups can also be connected to form ring structures. A highly preferred low residue surfactant of this type is a C12-14 acylamidopropylene (hydroxypropylene)_sulfobetaine that is available from Degussa-Goldschmidt under the tradename Rewoteric AM CAS-15U®.

Compositions of this invention containing the above hydrocarbyl amido sulfobetaine can contain more perfume and/or hydrophobic perfumes than similar compositions containing conventional anionic surfactants. This can be desirable in the preparation of consumer products.

Other very useful zwitterionic surfactants include hydrocarbyl, e.g., fatty alkylene betaines. These surfactants tend to become more cationic as pH is lowered due to protonation of the carboxyl anionic group, and in one embodiment have the generic formula:

$$R—N(R^1)_2{}^+—(CR^2{}_2)_n—COO^-,$$

wherein R is a hydrocarbon, e.g., an alkyl group containing from about 6 to about 20, preferably up to about 18, more preferably up to about 16 carbon atoms, each ($R^1$) is a short chain alkyl or substituted alkyl containing from about 1 to about 4 carbon atoms, preferably groups selected from the group consisting of methyl, ethyl, propyl, hydroxy substituted ethyl and propyl and mixtures thereof, more preferably methyl, ($R^2$) is selected from the group consisting of hydrogen and hydroxyl groups, and n is a number from about 1 to about 4, preferably about 1. A highly preferred low residue surfactant of this type is Empigen BB®, a coco dimethyl betaine produced by Albright & Wilson.

In another equally preferred embodiment, these betaine surfactants have the generic formula:

$$R—C(O)—N(R^2)—(CR^3{}_2)_n—N(R^2)_2{}^+—(CR^3{}_2)_n—COO^-,$$

wherein each R is a hydrocarbon, e.g., an alkyl group containing from about 6 to about 20, preferably up to about 18, more preferably up to about 16 carbon atoms, each ($R^2$) is either a hydrogen (when attached to the amido nitrogen), short chain alkyl or substituted alkyl containing from 1 to 4 carbon atoms, preferably groups selected from the group consisting of methyl, ethyl, propyl, hydroxy substituted ethyl and propyl and mixtures thereof, more preferably methyl, each ($R^3$) is selected from the group consisting of hydrogen and hydroxyl groups, and each n is a number from about 1 to about 4, more preferably about 2 or about 3, most preferably about 3, with no more than about 1 hydroxy group in any ($CR^3_2$) moiety. The R group can be linear or branched, saturated or unsaturated. The $R^2$ groups can also be connected to form ring structures. A highly preferred low residue surfactant of this type is TEGO Betain F®, a coco amido propyl betaine produced by Degussa-Goldschmidt.

The third class of preferred low residue surfactants comprises the group consisting of amphoteric surfactants. These surfactants function essentially as zwitterionic surfactants at acidic pH. One suitable amphoteric surfactant is a C8-C16 amido alkylene glycinate surfactant ('ampho glycinate'). Another suitable amphoteric surfactant is a C8-C16 amido alkylene propionate surfactant ('ampho propionate'). These surfactants are essentially cationic at acidic pH and preferably have the generic structure:

$$R—C(O)—(CH_2)_n—N(R^1)—(CH_2)_x—COOH,$$

wherein R—C(O)— is a C5-C15, pre hydrophobic fatty acyl moiety, each n is from about 1 to about 3, each R1 is preferably hydrogen or a C1-C2 alkyl or hydroxyalkyl group, and x is about 1 or about 2. Such surfactants are available, in the salt form, from Degussa-Goldschmidt chemicals under the tradename Rewoteric AM®. Examples of other suitable low residue surfactants include cocoyl amido ethyleneamine-N-(methyl) acetates, cocoyl amido ethyleneamine-N-(hydroxyethyl) acetates, cocoyl amido propyleneamine-N-(hydroxyethyl) acetates, and analogs and mixtures thereof.

Other suitable, amphoteric surfactants being either cationic or anionic depending upon the pH of the system are represented by surfactants such as dodecylbeta-alanine, N-alkyltaurines such as the one prepared by reacting dodecylamine with sodium isethionate according to the teaching of U.S. Pat. No. 2,658,072, N-higher alkylaspartic acids such as those produced according to the teaching of U.S. Pat. No. 2,438,091, and the products sold under the trade name "Miranol®", and described in U.S. Pat. No. 2,528,378, said patents being incorporated herein by reference.

Low-residue surfactants contribute to better filming/streaking performance (i.e., low or substantially no visible streaks- and/or film-formation) of the pre-moistened wipes according to the present invention. Whilst not wishing to be limited by theory, it is believed that the bulky sugar moieties of alkyl polyglycosides and sucrose esters function to inhibit the aggregation of surfactant that occurs upon evaporation of water in the aqueous solutions of the present invention. It is also believed that the zwitterionic and amphoteric surfactants show reduced aggregation relative to conventional surfactants because the intra-molecular electrostatic attractions between the anionically and cationically charged groups are stronger than the intermolecular surfactant-surfactant attractions. This results in a reduced tendency for molecular assembly that inhibits visible residue.

In a preferred embodiment according to the present invention, the low residue surfactant herein is selected in order to provide an Extracompa® black shiny ceramic tile (described in the experimental section) treated with the pre-moistened wipe herein with a gloss-meter reading such that at a 95% confidence level, the composition does not cause a significant loss in gloss on the tiles, relative to clean untreated tiles, when tested with a BYK gloss-meter® using a 60° angle setting. The test is performed as described the experimental herein below.

By 'not significant loss in gloss', it is meant herein that the mean difference in gloss between tiles treated with two separate wipe treatments using 15 readings for each is not statistically significant ($\alpha$=0.05). Similarly, by 'significant enhancement (or gain) in gloss', it is meant herein that the mean difference in gloss between tiles treated with two separate wipe treatments using 15 readings for each is statistically significant ($\alpha$=0.05). In these filming/streaking tests, statistical significance is established at the 95% confidence level ($\alpha$=0.05), using a one-tailed test and pair-wise statistical treatment of the samples. All samples are assumed to exhibit a normal distribution with equal variances. Using the raw data, t-tests are calculated and compared to the critical t statistic. When the calculated t-test exceeds t-critical, the samples are 'significantly' different. When t-calculated is less than t-critical, the samples are not 'significantly' different. The direction of the significance is determined by sign of the mean differences (i.e., 'either mean treatment $\delta$', 'mean $\delta$ (PHMB-noPHMB)' or 'mean $\delta$ (PHMB-Quat)'. For example, if the mean gloss for a treatment is higher than that of the untreated tile, and t-calculated exceeds t-critical, then the data suggest that at a 95% confidence level ( a =0.05) the treatment has a significantly higher gloss than the untreated tile. The statistics treatment of dependent paired samples ('mean treatment $\delta$') and independent paired samples ('mean $\delta$ PHMB-noPHMB' or 'mean $\delta$ (PHMB-Quat') can be found in Anderson, Sweeney and Williams, *Statistics for Business and Economics*, $6^{th}$ edition, West Publishing Company, 1996, incorporated herein by reference. The statistics can be conveniently run using the statistical function in Microsoft Excel™. Excel provides a P-value, which corresponds to the level of significance of the results. P-values below 0.05 indicate statistical significance at $\alpha$=0.05; P-values above 0.05 indicate no statistical significance at $\alpha$=0.05.

Low residue surfactants represent a particularly preferred sub-category of surfactants. Accordingly, low-residue surfactants can be present in the compositions of this invention at levels previously specified for the surfactants, i.e., from about 0.01% to about 1.5%, preferably of from about 0.01% to about 1.0%, and more preferably of from about 0.01% to about 0.5% by weight of the total composition. Importantly, the Applicant has found that the use of a low residue surfactant in combination with a conventional surfactant (i.e., non-low residue) can mitigate filming and/or streaking issues relative to similar compositions that only use the conventional surfactant.

Polymeric Biguanide:

As an essential ingredient the composition applied to the pre-moistened wipes according to the present invention comprises a polymeric biguanide. Any polymeric biguanide known to those skilled in the art, or mixtures thereof, may be used herein.

Biguanide agents are characterized in comprising at least one, preferably about 2 or more, biguanide moieties according to the following formula:

$$—NH—C(=NH)—NH—C(=NH)—NH—$$

In the context of the compositions of this invention, the polymeric biguanides are oligo- or poly (alkylene biguanides) or salts thereof or mixtures thereof. More preferred biguanides are oligo- or poly (hexamethylene biguanides) or salts thereof or mixtures thereof.

In a most preferred embodiment according to the present invention said polymeric biguanide is a poly (hexamethylene biguanide) or salt thereof according to the following formula:

$$—[—(CH_2)_3—NH—C(=NH)—NH—C(=NH)—NH—(CH_2)_3—]_n—$$

wherein n is an integer selected from about 1 to about 50, preferably about 1 to about 20, more preferably about 9 to about 18. More preferably said biguanide is a salt of a poly (hexamethylene biguanide) according to the following formula:

$$—[—(CH_2)_3—NH—C(=NH)—NH—C(=NH)—NH—(CH_2)_3—]_n—.nHX$$

wherein n is an integer selected from about 1 to about 50, preferably about 1 to about 20, more preferably about 9 to about 18, and HX is salt component, preferably HCl.

A most preferred poly (hexamethylene biguanide) hydrochloride (PHMB) wherein in the above formula n=12, is commercially available under the trade name Vantocil P®, Vantocil IB® or Cosmocil CQ® from Avecia. Another suitable PHMB wherein n=15, is commercially sold by Avecia under the tradename Reputex 20®. The choice of poly (hexamethylene biguanide) hydrochloride, as the most preferred polymeric biguanide for the compositions of this invention is driven by its unusually good filming and streaking properties within the scope of the compositions disclosed herein, and by its regulatory status as an approved antimicrobial active for hard surface cleaning applications in the European Union (Biocidal Products Directive) and in the United States (EPA actives list).

The Applicant has found that the micro-effectiveness of PHMB is optimized at relatively low concentrations of organic acid. For example, the effectiveness of PHMB as an antimicrobial active in a composition of the invention comprising 0.25% citric acid is enhanced relative to a similar composition comprising 1% citric acid. This is advantageous since lower concentrations of acid tend to result in improved filming and streaking benefits, all while promoting good antimicrobial efficiency.

Typically the composition herein may comprise up to about 2%, preferably from about 0.01% to about 1%, more preferably from about 0.02% to about 0.75%, even more preferably from about.03% to about 0.5%, by weight of the total composition of a polymeric biguanide. Those skilled in the art will appreciate that the level of polymeric biguanide is dependent on the magnitude of the gloss and optional antimicrobial benefits sought. Additionally, the polymeric biguanides do not deleteriously impact cleaning, and in some cases are found to provide improved cleaning versus identical compositions that do not comprise the polymer. Polymeric biguanides may also provide ‘next-time cleaning’ benefits, meaning that they make subsequent cleanings easier.

For hygiene claims in Europe, and sanitization, and ‘Limited Disinfection’ benefits in Canada and the United States, lower levels of polymeric biguanide, up to about 0.20%, are sufficient. For complete biocidal effectiveness against Gram positive and Gram negative microorganisms, it is recommended that at least about 0.20%, more preferably about 0.25% most preferably about 0.30% polymeric biguanide compound be included in the aqueous composition. Higher levels of biguanide may be needed, up to about 2%, for particularly tough to kill microorganisms such as *Trychophyton* or other fungi.

Optional Components

Solvents

As an optional but highly preferred ingredient the composition applied to the pre-moistened wipes comprises one or more solvents or mixtures thereof. Solvents can provide improved filming and/or streaking benefits. Whilst not wishing to be limited by theory, it is believed that solvents disrupt micelle formation, thus reducing surfactant aggregation. As such, they act as gloss toning agents, reducing gloss loss or promoting gloss gain on the surfaces of the present invention. Solvents are also beneficial because of their surface tension reduction properties help the cleaning profile of the compositions disclosed herein. Finally, solvents, particularly solvents with high vapour pressure, specifically vapour pressures of about 0.05 mm Hg at 25° C. and 1 atmosphere pressure (6.66 Pa) or higher, can provide cleaning and filming and/or streaking benefits without leaving residue.

Solvents for use herein include all those known in the art for use in hard-surface cleaner compositions. Suitable solvents can be selected from the group consisting of: aliphatic alcohols, ethers and di-ethers having from about 4 to about 14 carbon atoms, preferably from about 6 to about 12 carbon atoms, and more preferably from about 8 to about 10 carbon atoms; glycols or alkoxylated glycols; glycol ethers; alkoxylated aromatic alcohols; aromatic alcohols; terpenes; and mixtures thereof. Aliphatic alcohols and glycol ether solvents are most preferred, particularly those with vapour pressure of about 0.05 mm Hg at 25° C. and 1 atmosphere pressure (6.66 Pa).

Aliphatic alcohols, of the formula R—OH wherein R is a linear or branched, saturated or unsaturated alkyl group of from about 1 to about 20 carbon atoms, preferably from about 2 to about 15 and more preferably from about 5 to about 12, are suitable solvents. Suitable aliphatic alcohols are methanol, ethanol, propanol, isopropanol or mixtures thereof. Among aliphatic alcohols, ethanol and isopropanol are most preferred because of their high vapour pressure and tendency to leave no residue.

Suitable glycols to be used herein are according to the formula HO—CR1R2-OH wherein R1 and R2 are independently H or a C2-C10 saturated or unsaturated aliphatic hydrocarbon chain and/or cyclic. Suitable glycols to be used herein are dodecaneglycol and/or propanediol.

In one preferred embodiment, at least one glycol ether solvent is incorporated in the compositions of the present invention. Particularly preferred glycol ethers have a terminal C3-C6 hydrocarbon attached to from one to three ethylene glycol or propylene glycol moieties to provide the appropriate degree of hydrophobicity and, preferably, surface activity. Examples of commercially available solvents based on ethylene glycol chemistry include mono-ethylene glycol n-hexyl ether (Hexyl Cellosolve®) available from Dow Chemical. Examples of commercially available solvents based on propylene glycol chemistry include the di-, and tri-propylene glycol derivatives of propyl and butyl alcohol, which are available from Arco under the trade names Arcosolv® and Dowanol®.

In the context of the present invention, preferred solvents are selected from the group consisting of mono-propylene glycol mono-propyl ether, di-propylene glycol mono-propyl ether, mono-propylene glycol mono-butyl ether, di-propylene glycol mono-propyl ether, di-propylene glycol mono-butyl ether; tri-propylene glycol mono-butyl ether; ethylene glycol mono-butyl ether; di-ethylene glycol mono-butyl ether, ethylene glycol mono-hexyl ether and di-ethylene glycol mono-hexyl ether, and mixtures thereof. “Butyl” includes normal butyl, isobutyl and tertiary butyl groups. Mono-propylene glycol and mono-propylene glycol mono-butyl ether are the most preferred cleaning solvent and are available under the tradenames Dowanol DPnP® and Dowanol DPnB®. Di-propylene glycol mono-t-butyl ether is commercially available from Arco Chemical under the tradename Arcosolv PTB®.

In a particularly preferred embodiment, the cleaning solvent is purified so as to minimize impurities. Such impurities include aldehydes, dimers, trimers, oligomers and other by-products. These have been found to deleteriously affect product odour, perfume solubility and end result. The inventors have also found that common commercial solvents, which contain low levels of aldehydes, can cause irreversible and irreparable yellowing of certain hard surfaces. By purifying the cleaning solvents so as to minimize or eliminate such impurities, surface damage is attenuated or eliminated.

Though not preferred, terpenes can be used in the present invention. Suitable terpenes to be used herein monocyclic terpenes, dicyclic terpenes and/or acyclic terpenes. Suitable terpenes are: D-limonene; pinene; pine oil; terpinene; terpene derivatives as menthol, terpineol, geraniol, thymol; and the citronella or citronellol types of ingredients.

Suitable alkoxylated aromatic alcohols to be used herein are according to the formula R-$(A)_n$-OH wherein R is an alkyl substituted or non-alkyl substituted aryl group of from about 1 to about 20 carbon atoms, preferably from about 2 to about 15 and more preferably from about 2 to about 10, wherein A is an alkoxy group preferably butoxy, propoxy and/or ethoxy, and n is an integer of from about 1 to about 5, preferably about 1 to about 2. Suitable alkoxylated aromatic alcohols are benzoxyethanol and/or benzoxypropanol.

Suitable aromatic alcohols to be used herein are according to the formula R—OH wherein R is an alkyl substituted or non-alkyl substituted aryl group of from about 1 to about 20 carbon atoms, preferably from about 1 to about 15 and more preferably from about 1 to about 10. For example a suitable aromatic alcohol to be used herein is benzyl alcohol.

When present, solvents are found to be most effective at levels from about 0.5% to about 25%, more preferably about 1.0% to about 20% and most preferably, about 2% to about 15%.

Antifoaming Agent

The pre-moistened wipes preferably also comprise an antifoaming agent, preferably in the liquid composition. Any antifoaming agent known in the art is suitable for the present invention. Highly preferred antifoaming agents are those comprising silicone. Other preferred antifoaming agents may further comprise a fatty acid and/or a capped alkoxylated nonionic surfactant as defined herein after.

Preferably the amount of antifoaming agent used expressed in weight percent active, i.e., silicone (usually poly-dimethyl siloxane), fatty acid or capped alkoxylated nonionic surfactant, is from about 0.001% to about 0.5%, more preferably from about 0.005% to about 0.2%, most preferably from about 0.01% to about 0.1% of the weight of the aqueous lotion composition as made prior to impregnation onto the dry substrate.

Typically, if present, the fatty acid antifoaming agent is present at a concentration of from about 0.01% to about 0.5%, preferably from about 0.01% to about 0.5%, and more preferably from about 0.03% to about 0.2% by weight of the aqueous lotion composition as made prior to impregnation onto the dry substrate.

Typically, when present, the capped alkoxylated nonionic surfactant antifoaming agent is present at a concentration of from about 0.01% to about 1%, preferably from about 0.01% to about 0.5% and more preferably from about 0.03%% to about 0.2% by weight of the aqueous lotion composition as made prior to impregnation onto the dry substrate.

It is understood to those skilled in the art that combinations of antifoaming agents can also be used to provide the desired suds profile for a given aqueous composition.

Suitable capped alkoxylated nonionic surfactants for use herein are according to the formula:

$$R1(O—CH2-CH2)_n-(OR2)_m-O—R3$$

wherein R1 is a C8-C24 linear or branched alkyl or alkenyl group, aryl group, alkaryl group, preferably $R^1$ is a C8-C18 alkyl or alkenyl group, more preferably a $C_{10}$-$C_{15}$ alkyl or alkenyl group, even more preferably a C10-C15 alkyl group; wherein R2 is a C1-C10 linear or branched alkyl group, preferably a C2-C10 linear or branched alkyl group, preferably a C3 group; wherein R3 is a C1-C10 alkyl or alkenyl group, preferably a C1-C5 alkyl group, more preferably methyl; and wherein n and m are integers independently ranging in the range of from about 1 to about 20, preferably from about 1 to about 10, more preferably from about 1 to about 5; or mixtures thereof.

Suitable silicones for use herein include any silicone and silica-silicone mixtures. Silicones can be generally represented by alkylated polysiloxane materials (e.g., poly-dimethyl siloxanes), while silica is normally used in finely divided forms exemplified by silica aerogels and xerogels and hydrophobic silicas of various types. These materials can be incorporated as particulates in which the silicone is advantageously releasably incorporated in a water-soluble or water-dispersible, substantially non-surface-active detergent impermeable carrier. Alternatively, the silicone can be dissolved or dispersed in a liquid carrier and applied by spraying on to one or more of the other components.

One preferred antifoaming agent in accordance with the present invention is available from Wacker as Wacker silicone antifoaming emulsion SE 2®. Other preferred antifoam agents include Dow Corning AF® emulsion and Dow Corning DB® emulsion.

Hydrotropes:

Hydrotropes are advantageously used to ensure solubility of the aqueous composition compositions, and in particular to ensure adequate perfume solubility. Hydrotropes include the sulfonates of toluene, xylene and cumene, sulfates of naphthalene, anthracene, and higher aromatics, and C3-C10 linear or branched alkyl benzenes, C6-C8 sulfates such as hexyl sulfate and 2-ethyl-1-hexyl sulfate, short chain pyrrolidones such as octyl pyrrolidone, and the like. Other preferred hydrotropes include the oligomers and polymers comprising polyethylene glycol. In a particularly preferred embodiment, alkyl ethoxylates comprising at least an average of about 15 moles of ethylene oxide, more preferably at least about 20 moles of ethylene oxide per mole chain length (alcohol) are advantageously employed. Unlike conventional hydrotropes, the preferred alkyl ethoxylate hydrotropes are found to have little or no impact on the filming and streaking properties of the compositions of the present invention. When present, hydrotropes are preferably used at solution weight percent of from about 0.01% to about 0.5%, more preferably about 0.03% to about 0.25%.

The liquid compositions according to the present invention may comprise a variety of other optional ingredients depending on the technical benefit aimed for and the surface treated. Suitable optional ingredients for use herein include polymers, buffers, perfumes, colorants, pigments and/or dyes.

Filming/Streaking, Cleaning and Antimicrobial Performance

The Applicant has found that the interaction of the substrate as described herein, the composition pH, the surfactant(s) and the polymeric biguanide-containing composition results in a pre-moistened wipe showing very low or even no filming/streaking ("filming/streaking performance benefit") when used on a hard surface, preferably when used on a shiny hard surface. The overall filming and streaking profiles of surfaces treated with the compositions of the invention benefits are particularly good when the surfactant is a low-residue surfactant. Without being bound by theory, it is believed that part of the filming and streaking benefits are partly attributable to the properties of the substrate. Indeed, it has been found that the solution-induced leaching of binder and/or latex from the substrate leads to undesirable deposits on surfaces to be cleaned by the pre-moistened wipe. This deposition may lead to filming and/or streaking. The release of binder and/or latex may be due to the interaction of a composition applied to said substrate and the binder and/or latex of the substrate. Therefore, the use of a substantially binder and/or latex material-free substrate will eliminate the substrate as a source of filming and/or streaking on hard surfaces. Moreover, the leaching of binder and latex and associated by-products is enhanced for pre-moistened wipes comprising aqueous compositions at low pH (e.g., below pH 5) or compositions containing aggressive or reactive chemical compounds (such as glycol ether solvents, isopropyl alcohol or raw materials that can react with the substrate binder).

So as to reduce the overall level of filming and/or streaking while still providing antimicrobial benefits in a hard surface cleaner context, proper selection of the components in the aqueous solution is essential. The polymeric biguanide induces no incremental visible film or streak negatives when used in a pre-moistened wipe comprising the composition pH and surfactant as described herein to treat a hard surface. More preferably, the pre-moistened wipe is selected such that in order to provide an Extracompa® black shiny porcelain tile treated with the pre-moistened wipe herein with a gloss-meter reading such that at a 95% confidence level, the polymeric biguanide induces a significant enhancement of gloss, relative to identical compositions lacking the polymeric biguanide, when tested with a BYK-Gardner micro-TRI-gloss gloss-meter® using a 60° angle setting. Without being bound by theory, it is believed that the polymeric biguanide compound acts as a wetting polymer at a pH of 7 or less in the presence surfactant. As such, it functions as a hydrophilic agent, helping evenly distribute the aqueous composition throughout the surface to be treated. It is believed that the polymeric biguanide forms a colorless, uniform film on the treated hard surfaces, attenuating or masking the streaks and/or films due to other components in the composition, or enhancing the shine/gloss of the treated surface when the other components in the composition do not cause streaking and/or filming issues.

The biguanide compound does not interact very strongly with charged surfaces, meaning that the primary interaction is between surfactants, solvents (i.e., cleaning agents) and the surface to be treated. As a result, the biguanide compound has a lower tendency to bind on hard surfaces and leave films and streaks. The wetting ability of the polymeric biguanide material in this context is very surprising given that the alternative cationic antimicrobial actives, quaternary ammonium surfactants ('quats'), are very poor wetting compounds. By quaternary ammonium surfactants, it is meant all surfactants of the form $R1R2R3R4N^+$, wherein R1 is a C8 to C18 alkyl group, R2 and R3 are C1 to C18 alkyl groups, benzyl groups or substituted benzyl groups and R4 is a methyl group. Such materials are widely available commercially and are sold by Lonza Corporation and Stepan Corporation as effective antimicrobial compounds. Quaternary ammonium compounds exhibit hydrophobic behavior in aqueous media. As such, they de-wet the surfaces being treated. This leads to non-uniform cleaning and drying, and undesirable accelerated aggregation of the solids on the surfaces upon evaporation of the water from the aqueous composition. This leads to high levels of streaks. Moreover, quaternary ammonium compounds are highly charged chemical species that will bind to negatively charged surfaces, including glass and ceramic. Once bound to these surfaces, removal can require use of a second treatment comprising anionic surfactants and the like, for removal of the quaternary ammonium compounds (quats). This is highly undesirable. In one-step cleaning applications, quats will build up on negatively charged surfaces. The polymeric biguanide compounds, within the framework provided by the compositions of this invention, are excellent wetting agents and do not strongly bind anionic surfaces. The polymeric biguanide surface film is clean and strip-able, meaning that it is easily removed and replaced in subsequent cleaning applications. Additionally, the hydrophilic nature of the polymer helps the wetting of surfaces, which makes next-time cleaning applications easier. In instances wherein the polymeric biguanides are used to clean vertical tiles (for example bathroom shower tiles), the compositions "sheet" water very well ensuring evenness of cleaning or easier rinsing of tiles.

Accordingly, the pre-moistened wipe is selected such that in order to provide a black shiny porcelain tile, preferably an Extracompa® black shiny porcelain tile, treated with the pre-moistened wipe herein with a gloss-meter reading such that at a 95% confidence level, the polymeric biguanide induces a significant enhancement of gloss, relative to identical compositions that substitute quaternary ammonium surfactant for the polymeric biguanide at equivalent weight concentrations, when tested with a BYK-Gardner micro-TRI-gloss gloss-meter® using a 60° angle setting.

The magnitude of the gloss improvement provided by the polymeric biguanides of the present invention, relative to similar compositions not comprising polymeric biguanides, will depend on the level of polymer incorporated. Increased levels of polymer will provide increased gloss. The Applicant has found that it is relatively straightforward to increase the gloss of untreated tiles with the compositions herein when said compositions comprise at least 0.5% polymeric biguanide and more preferably at least 0.75% polymeric biguanide. As such, the pre-moistened wipe is selected in order to provide an Extracompa® black shiny porcelain tile treated with the pre-moistened wipe herein with a gloss-meter reading such that at a 95% confidence level, a concentration of 0.5% polymeric biguanide by weight of the aqueous composition induces a significant enhancement of gloss, relative to identical compositions that do not comprise the polymeric biguanide, when tested with a BYK-Gardner micro-TRI-gloss gloss-meter® using a 60° angle setting.

Despite the hydrophilic behavior on surfaces, the polymeric biguanides within the context of the compositions of the invention are shown to exhibit strong antimicrobial properties comparable to those of quaternary ammonium surfactants.

The disinfecting and/or antimicrobial performance of a given pre-moistened wipe can be assessed using the standard protocol required by governmental agencies in North America and Western Europe. The results presented in the experimental section illustrate the United States wipe protocol for achieving "hospital" grade disinfectancy claims. Hospital grade disinfectancy represents the strongest claim allowed by the United States Environmental Protection Agency and has the most stringent requirements. It requires complete biocidal effectiveness against two Gram negative organisms, *Salmonella cholerasuis* and *Pseudomonas aeruginosa*, and one Gram positive organism, *Staphylococcus aureus*. Various related antimicrobial protocols exist in Europe and will be standardized for the EU with the Biocidal Products Directive in the coming years.

According to the present invention, the compositions are selected so as to maximize the gloss on a standard black shiny porcelain tile (described hereinafter). The Applicant has found that the polymeric biguanide compound assists in gloss enhancement or retention. More specifically, the gloss readings provided by compositions that comprise the polymeric biguanide compound are equal or better than the gloss readings provided by identical compositions lacking the polymeric biguanide compound. The compositions of the invention also provide gloss enhancement versus similar compositions that comprise an equivalent weight concentration of quaternary ammonium surfactant instead of the polymeric biguanide. That is, the polymeric biguanide compound preserves or enhances the shine benefits of the clean tiles.

Whist the effect of the biguanide compound applies to most surfactants, use of low residue surfactants is beneficial in that it delivers higher gloss readings for the compositions of the invention. In order to influence the gloss-meter reading the type surfactant for use in the composition to be applied onto the substrate as described herein can be varied.

Packaging Form of the Pre-Moistened Wipes

The pre-moistened wipes according to the present invention may be packaged in a box, preferably in a plastic box.

In a preferred embodiment according to the present invention, the pre-moistened wipes are provided in a stacked configuration, which may comprise any number of wipes. Typically, the stack comprises from 2 to 150, more preferably from 5 to 100, most preferably from 10 to 60 wipes. Moreover the wipes may be provided in any configuration folded or unfolded. Most preferably, the wipes are stacked in a folded configuration.

Process for Cleaning a Surface

In a preferred embodiment, the present invention encompasses a process of cleaning a surface, preferably a hard surface, comprising the step of contacting, preferably wiping, said surface with a pre-moistened wipe as described herein. In another preferred embodiment of the present application, said process comprises the steps of contacting parts of said surface, more preferably soiled parts of said surface, with said pre-moistened wipe. In yet another preferred embodiment said process, after contacting said surface with said pre-moistened wipe, further comprises the step of imparting mechanical action to said surface using said pre-moistened wipe. By "mechanical action" it is meant herein, agitation of the pre-moistened wipe on the surface, as for example rubbing the surface using the pre-moistened wipe.

By "hard-surfaces", it is meant herein any kind of surfaces typically found in houses like kitchens, bathrooms, or in car interiors or exteriors, e.g., floors, walls, tiles, windows, sinks, showers, shower plastified curtains, wash basins, WCs, dishes, fixtures and fittings and the like made of different materials like ceramic, vinyl, no-wax vinyl, linoleum, melamine, glass, any plastics, plastified wood, metal or any painted or varnished or sealed surface and the like. Hard-surfaces also include household appliances including, but not limited to, refrigerators, freezers, washing machines, automatic dryers, ovens, microwave ovens, dishwashers and so on.

Test Methodologies

The test methodologies shown below illustrate the benefits of the compositions of the present invention. They include a filming and streaking test, a cleaning test and an antimicrobial test.

Filming and Streaking Test

The filming/streaking performance of a given pre-moistened wipe, can be assessed using the following test method:

Test Tile:

Extracompa® black glossy ceramic tiles, obtained from Senio (via Tarroni 1 48012 Bagnacavallo (RA), Italy), with dimensions 20 cm×20 cm×1 cm are employed as the test surface. Prior to use, the tile surfaces are washed with soap and water. They are then rinsed with about 500 ml distilled water and wiped dry using paper towel, preferably using a low-binder clean paper towel such as Scott® paper towels. Approximately five milliliters of a 50% water, 50% 2-propanol solution mix is applied from a squirt bottle to the surface of the tiles, spread to cover the entire tile using clean paper towel and then wiped to dryness with more paper towel. The application of the water/2-propanol treatment is repeated and the tiles are allowed to air dry for five minutes. The test tiles are positioned on a horizontal surface, completely exposing the ceramic surface prior to testing. Prior to initiating the wiping with test products, the tiles gloss readings for the cleaned tiles are measured and recorded. The measurement is performed using a 'BYK-Gardner micro-TRI-gloss®' gloss-meter using the 60° angle setting. The BYK gloss-meter® is manufactured by BYK-Gardner, catalog number GB4520. The gloss of each tile is analytically measured at the four corners and the center of the tile, and the readings averaged. Tests are then conducted on single test tiles with a total of 3 replicates to ensure reproducibility.

Test Wipes:

Several test wipes are used to illustrate the benefits of the compositions of the present invention. In all cases, wipes with homogeneously distributed fibers are used. For purposes of making comparisons, the basis weight is standardized at 60 $gm^{-2}$ and the load factor is set to 3.2 grams of aqueous solution per gram of substrate, i.e., load factor=3.2×. Substrates are loaded at least 4, preferably 7, days prior to the use; the wipes are stored in sanitized bags or more preferably flow wrap packaging prior to use. The purpose of the 4-7 day wait is to simulate commercial production, and ensure proper wetting and swelling of fibers, and provide sufficient time for the interaction between the aqueous compositions and the test substrates to take place. The size of experimental wipes is standardized at 26 cm*17 cm. Commercially available competitive wipes are tested as is, i.e., taken directly out of the package and used without alteration of any kind. The competitive wipes tested all have similar, though not identical dimensions as the experimental wipes intended to illustrate the invention.

Wiping Procedure:

In each case, the wipes are first folded in half along the longer side of the wipe. The wipes are then crimped between the second and third fingers along the center part of the length of the half wipe (the thumb is labeled as the first finger) so as to ensure a good grip of the wipe, in such a manner so as to allow the rest of the operator's hand to lie flat on surface of the wipes. The now hand-held wipes is placed on the upper left hand corner of the tiles, and then made to wipe the complete surface of the test tiles in five un-interrupted wipe motions: first from left to right, then right to left, then left to right, then right to left, and finally left to right, all while progressively wiping down the test tiles. The wiping motion is made continuously from side to side as described above, and the final pass is completed past the end of the tile. Wiping time duration is about 3-4 seconds per tile.

Grading:

Grading is performed within 30 minutes after the tiles have been wiped. For each test product (which consists of a substrate and impregnated lotion), the wiping procedure described above is performed five times. The tiles are allowed to air dry at ambient conditions (20° C.-25° C. at a relative humidity of 40-50%) and then graded. Tiles are graded using visual grades and gloss-meter readings. Two sets of measurements are selected since the gloss-meter measurements allow for an analytical estimate of filming, while the visual grades advantageously employ human visual acuity for the identification of streaks and blotchy areas. The two grades are viewed as complementary and usually show similar trends. Visual grading is done with 5 expert panelists such that the panelists do not know the identity of the specific products tested. Visual grading of is conducted using a 0 to 4 scale, where 4 indicates a very streaky/filmy end result and 0 is a completely perfect end result. Tile residue is analytically measured using a BYK Gardner micro-TRI-gloss gloss-meter® using a 60° angle setting. The BYK gloss-meter is manufactured by BYK-Gardner, catalog number GB-4520. This method results in 15 visual grade data points being collected per treatment. Once the wipes tiles are dry (air dried at ambient conditions), the gloss of each tile is analytically measured with the gloss-meter at the four corners and the center of the tile, and the readings averaged. The averages for each of the 3 tiles tested are computed and then averaged. This ‘average of averages’ is then compared to the ‘average of averages’ computed on the pre-cleaned tiles; the standard deviation for gloss loss (gain) is obtained using all 15 gloss readings, wherein each gloss measurement recorded corresponds to the difference between clean and treated tile. The overall appearance of tiles will depend on both, the amount of streaking and filming on the tiles.

Cleaning Tests

The following cleaning protocol is employed to illustrate the cleaning efficacy of the pre-moistened wipes of the present invention. Due to variability between tests (slight differences in tile placement, oven heating, time etc.), statistical significance can only be assigned for groups of product run within a test set. Each test set, as configured in the experiments described below, consists of 4 product treatments. In these tests, statistical significance is established at the 90% confidence level using a one-tailed test (α=0.10), and pair-wise statistical treatment of the samples.

Kitchen Dirt Cleaning:

The cleaning effectiveness of the wipes on kitchen dirt is illustrated as follows:

Four (4) standard porcelain enamel tiles are soiled with grease, consisting of partially polymerized oil and particulate matter. The soiled tiles are then backed at 150° C. for 40 minutes (after 20 minutes, the tiles are rotated 180° so as to ensure even-ness of baking) in a mechanical convection oven (model 625 Freas®). The enamel plates are allowed to cool to room temperature (~30 minutes) and then used immediately for testing. Sponges with dimensions 14 cm×9 cm×2.5 cm purchased from VWR Scientific, catalog No. 58540-047, cut to size by cutting each sponge in thirds along the width of the sponge, washed in a conventional washing machine with detergent and then washed in plain water in a washing machine 3 times so as to strip the sponge finishes. The sponges are then allowed to dry in a working fume hood for 48 hours. The dimensions of the dry sponges after air-drying are about 9 cm×4.5 cm×2.5 cm. Dry test sponges are weighed (5±1 grams). Four (4) sponges are placed in a 903/PG Washability Tester (Sheen Instruments, Ltd (Surrey, United Kingdom)). Pre-moistened wipes are then attached to the sponges (without folding the pre-moistened wipe) so as to expose the wipe to one of soiled enamel tiles placed in the 903/PG Washability Tester. Cleaning is initiated and the number of strokes required for complete soil removal is determined.

Each treatment is tested for cleaning a minimum of 4 times and the mean number of strokes for cleaning and standard deviation are computed. In these tests, statistical significance is established at the 90% confidence level using a one-tailed test (α=0.10), using pair-wise statistical treatment of the samples.

Antimicrobial Tests for Pre-Moistened Wipes

In a highly preferred embodiment, the compositions of the present invention provide antimicrobial benefits. The antimicrobial effectiveness of the wipes can be assessed using the following wipe (disposable towelette) protocol:

60 glass carriers are inoculated with bacteria, dried, and then wiped (10 carriers per towelette) for 30 seconds with the wipe. All are neutralized to stop the action of the antimicrobial, and then incubated in media. 59 of the 60 carriers must be free of bacteria, as demonstrated by clear media after incubation. The exact details of inoculation, treatment, and subsequent assessment can be found in Protocol PG12022201.TOW (Viromed), incorporated herein by reference.

Experimental Data and Examples

The following examples are meant to exemplify compositions used in a process according to the present invention but are not necessarily used to limit or otherwise define the scope of the present invention. The aqueous compositions are made by combining the listed ingredients in the listed proportions to form homogenous mixtures (solution weight % unless otherwise specified).

Pre-Moistened Wipe Compositions

Several substrates are used to illustrate the invention. All substrates have homogeneously distributed fibers, have dimensions 26 cm*17 cm, are initially dry, and are impregnated with lotion at a 3.2× load factor. Four substrate types are evaluated as follows:

Substrate 1 is a hydroentangled 60 $g/m^{-2}$ substrate, consisting of 60% polypropylene and 40% rayon fibers that is substantially free of binders and latexes;

Substrate 2 is a hydroentangled 60 $g/m^{-2}$ substrate, consisting of 100% rayon fibers, that is substantially free of binders and latexes;

Substrate 3 is a hydroentangled 60 $g/m^{-2}$ substrate, consisting of 100% polyester fibers, that is substantially free of binders and latexes;

Substrate 4 is an air-laid, 60 $g/m^{-2}$ substrate, consisting of 70% pulp, 16% Lyocell®, and 12% binder fibers that are homogeneously distributed within the web.

The aqueous compositions A-Z-IV to be loaded on the substrates are made starting from a base product lacking surfactant and polymer/antimicrobial agent. The base products for these compositions comprise: 0.05% C12-14 EO21, 0.5% citric acid, 2% propylene glycol n-butyl ether (Dowanol PnB®), 8% ethanol and 0.1% perfume, and the remainder, excluding the hole left for surfactant and antimicrobial agent, up to 100%, water. Surfactant and antimicrobial agent are then incorporated into the base product and the resulting compositions loaded onto the substrates as shown in the table below. All compositions are found to have pH near 3.5.

Compositions AA-AI illustrate the benefits of the organic acid comprising at least one hydroxyl group within the scope of this invention. The base products for these compositions comprise: 0.22% C12-14 sulfobetaine, 0.05% C12-14 E021, 0.5% acidifying agent (except for compositions AG-AI), 2% propylene glycol n-butyl ether (Dowanol PnB), 8% ethanol and 0.1% perfume, and the remainder, excluding the hole left for polymeric biguanide, up to 100%, water.

| | A | B | C | D | E | F | G | H | I | J |
|---|---|---|---|---|---|---|---|---|---|---|
| Surfactants (%) | | | | | | | | | | |
| C12-14 sulfobetaine* | 0.22 | 0.22 | 0.22 | 0.22 | — | — | — | — | — | — |
| C8-16 APG** | — | — | — | — | 0.22 | 0.22 | — | — | — | — |
| C12-16 betaine*** | — | — | — | — | — | — | 0.22 | 0.22 | — | — |
| C9-11EO6**** | — | — | — | — | — | — | — | — | 0.22 | 0.22 |
| Antimicrobial (%) | | | | | | | | | | |
| PHMB† | — | 0.3 | — | — | — | 0.3 | — | 0.3 | — | 0.3 |
| ADBAC‡ | — | — | 0.3 | — | — | — | — | — | — | — |
| DADAC‡‡ | — | — | — | 0.3 | — | — | — | — | — | — |
| Substrate Type | 1 | 1 | 1 | 1 | 1 | 1 | 1 | 1 | 1 | 1 |
| Binders/Latexes? | No | no | no | no | no | No | No | no | no | no |
| | K | L | M | N | O | P | Q | R | S | T |
| Surfactants (%) | | | | | | | | | | |
| C12-14 sulfobetaine* | 0.22 | 0.22 | 0.22 | 0.22 | 0.22 | 0.22 | 0.22 | 0.22 | 0.22 | — |
| C12-14 Amphoteric (V*) | — | — | — | — | — | — | — | — | — | 0.22 |
| Antimicrobial (%) | | | | | | | | | | |
| PHMB† | — | 0.3 | — | — | 0.3 | — | — | 0.3 | — | — |
| ADBAC‡ | — | — | 0.3 | — | — | 0.3 | — | — | 0.3 | — |
| Substrate Type | 2 | 2 | 2 | 3 | 3 | 3 | 4 | 4 | 4 | 1 |
| Binders/Latexes? | No | no | no | no | no | No | yes | yes | yes | no |
| | U | V | W | X | Y | Z | ZZ | ZZZ | Z-IV | |
| Surfactants (%) | | | | | | | | | | |
| C12-14 Amphoteric (V*) | 0.22 | — | — | 0.22 | — | — | — | | | |
| C9-11EO6**** | | 0.22 | 0.22 | — | 0.22 | — | — | | | |
| C12-14 sulfobetaine* | — | — | — | — | — | 0.22 | — | | | |
| Coco betaine*** | — | — | — | — | | — | 0.22 | | | |
| Soya sucrose ester (VI*) | — | — | — | — | — | — | — | 0.22 | 0.22 | |
| Polymer (%) | | | | | | | | | | |
| PHMB† | 0.3 | — | 0.3 | 1 | 1 | 1 | 1 | — | 0.3 | |
| Substrate Type | 1 | 1 | 1 | 1 | 1 | 1 | 1 | 1 | 1 | |
| Binders/Latexes? | no | no | no | no | no | No | no | no | no | |
| | AA | AB | AC | AD | AE | AF | AG | AH | AI | |
| Surfactants (%) | | | | | | | | | | |
| C8-16 APG** | 0.22 | 0.22 | 0.22 | 0.22 | 0.22 | 0.22 | 0.22 | 0.22 | 0.22 | |
| Organic Acid (%) | | | | | | | | | | |
| Tartaric acid | 0.5 | 0.5 | — | — | — | — | — | — | — | |
| Lactic acid | — | — | 0.5 | 0.5 | — | — | — | — | — | |
| DAGS∇ | — | — | — | — | 0.5 | 0.5 | — | — | — | |
| Hydrochloric acid | — | — | — | — | — | — | — | — | — | |
| Alkalinity Agent (%) | | | | | | | | | | |
| Sodium carbonate | — | — | — | — | — | — | — | — | 0.05 | |

-continued

| Polymer (%) | | | | | | | | | |
|---|---|---|---|---|---|---|---|---|---|
| PHMB† | — | 0.3 | — | 0.3 | — | 0.3 | — | 0.3 | 0.3 |
| Substrate Type | 1 | 1 | 1 | 1 | 1 | 1 | 3 | 3 | 3 |
| Binders/Latexes? | no | no | no | no | no | no | no | no | no |

*Cocoamido propyl sulfobetaine made by Degussa-Goldschmidt under the tradename Rewoteric AM CAS 15-U ®
**Alkyl PolyGlucoside made by Cognis under the tradename Plantaren 2000 ®
***C12-16 dimethyl betaine made by Albright & Wilson under the trade name Empigen BB/L ®
****Alkyl ethoxylate (6) made by Shell Chemical under the trade name Neodol 91-6 ®
(V*)N-coconut fatty acid amidoethyl N-hydroxyethyl amino propionic acid, sodium salt, made by Degussa-Goldschmidt under the trade name Rewoteric AM KSF 40 ®
(VI*)C16-18 sucrose ester made by Procter & Gamble under the trade name SEFA 16-18S ®
†Poly (hexamethylene biguanide) made by Avecia under the tradename Vantocil IB ®
‡Alkyl Dimethyl Benzyl Ammonium Chloride made by Lonza under the tradename Barquat 4280 ®
‡‡DiAlkyl Dimethyl Ammonium Chloride made by Lonza under the tradename Bardac 2280 ®
VDiacids: Adipic, glutaric and succinic manufactured by Rhodia as a commercial mixture.

As an illustration, the filming and streaking profiles for several European and North American competitor antimicrobial wipes were also run. Each competitor employs quaternary ammonium surfactant to achieve antimicrobial benefits. In the case of the North American competitors, the amount of quaternary ammonium surfactants a weight percent of the lotion is 0.28% for Lysol® (Reckitt) and 0.29% for the Clorox wipes. The competitors are: Product C1 corresponding to Dettox® antimicrobial wipes (UK), product C2 corresponding to Ajax® antimicrobial wipes (Belgium), product C3 corresponding to Lysol® antimicrobial wipes (USA) and product C4 corresponding to Clorox® antimicrobial wipes.

Filming and Streaking Experimental Results

The data below are tabulated in terms of gloss-meter measurements and visual grades. As indicated in the experimental section, the gloss-meter readings (mean treatment 6) are computed as a difference in gloss between tiles treated with the experimental compositions herein and that for the corresponding clean, untreated tiles. The clean tiles all have 60° angle gloss readings between 92 and 94. Gloss losses (gains) are computed as differences in readings. Positive values represent a loss in gloss. Negative values () suggest a gain in gloss. The mean gloss loss (gain) caused by treatments versus untreated tiles (mean treatment δ), and associated statistical significance are calculated. The mean gloss (gain) on tile caused by the addition of PHMB (mean δ (PHMB-noPHMB)) and associated statistical significance is also reported. The mean gloss (gain) on tile caused by poly (hexamethylene biguanide) versus quaternary ammonium surfactant (mean δ (PHMB-Quat)) and statistical significance are also reported.

In these tests, statistical significance is established at the 95% confidence level ($\alpha$=0.05), using a one-tailed test and pair-wise statistical treatment of the samples. All samples are assumed to exhibit a normal distribution with equal variances. Using the raw data, t-statistics are calculated and compared to the t-critical statistic. When the calculated t-test exceeds t-critical, the samples are 'significantly different. When t-calculated is less than t-critical, the samples are not 'significantly' different. The direction of significance is determined by the sign of the mean differences (i.e., 'mean treatment δ', 'mean δ (PHMB-noPHMB)' or 'mean δ (PHMB-Quat)'. For example, if the treatment mean gloss for a treatment is higher than that of the untreated tile, and t-calculated exceeds t-critical, then the data suggest that at a 95% confidence level ($\alpha$=0.05) the treatment has a significantly higher gloss than the untreated tile. The statistic treatment of dependent paired samples (mean treatment δ) and independent paired samples ((PHMB-noPHMB or mean δ (PHMB-Quat)) can be found in Anderson, Sweeney and Williams, *Statistics for Business and Economics*, 6$^{th}$ edition, West Publishing Company, 1996, incorporated herein by reference. The statistics can be conveniently run using the statistical function in Microsoft Excel™.

The streaking grades are provided as 0-4 visual grades using 5 expert panelists. The mean grade and standard deviations are computed. The significance of differences in visual grading is defined in analogous manner as described for the gloss-meter test.

For products C1, C2, C3 and C4, no data for base products, i.e., identical liquid compositions lacking the antimicrobial active, can be obtained. In this instance the difference in gloss due loss (gain) due to the experimental treatments is compared to the difference in gloss loss due to the commercial products (mean δ (B-competitor) and mean δ (F-competitor)). A comparison of the filming/streaking on tile caused by the prototypes of the present invention (treatments B and F), relative to that of the commercially sold products, is then made.

| | A | B | C | D | E | F | G | H | I | J |
|---|---|---|---|---|---|---|---|---|---|---|
| Gloss | | | | | | | | | | |
| Mean treatment δ | 0.5 | 0.2 | 1.9 | 13.6 | 1.1 | (0.5) | 1.8 | 0.7 | 0.5 | 0.3 |
| Treatment δ Std. Dev. | 0.28 | 0.28 | 0.6 | 3.4 | 0.6 | 0.29 | 0.35 | 0.33 | 0.49 | 0.43 |
| Mean δ (PHMB-noPHMB) | Ref. | (0.3) | | | Ref. | (1.6) | Ref. | (1.1) | Ref. | (0.2) |

-continued

| | | | | | | | | | | |
|---|---|---|---|---|---|---|---|---|---|---|
| δ (PHMB-noPHMB) Significant? | Ref. | Yes | | | Ref. | Yes | Ref. | Yes | Ref. | No |
| Mean δ (PHMB-Quat) | | Ref. | (1.6) | (13.4) | | | | | | |
| δ (PHMB-Quat) Significant? | | Ref. | Yes | Yes | | | | | | |
| Visual | | | | | | | | | | |
| Mean grade | 0.6 | 0.3 | 2.5 | 3.6 | 0.2 | 0.1 | 0.6 | 0.0 | 2.2 | 0.9 |
| Treatment δ Std. Dev. | 0.46 | 0.2 | 0.55 | 0.48 | 0.23 | 0.11 | 0.22 | 0.0 | 0.73 | 0.73 |
| Mean δ (PHMB-noPHMB) | Ref. | (0.3) | | | Ref. | (0.2) | Ref. | (0.6) | Ref. | (1.3) |
| δ (PHMB-noPHMB) Significant? | Ref. | Yes | | | Ref. | No | Ref. | Yes | Ref. | Yes |
| Mean δ (PHMB-Quat) | | Ref. | (2.3) | (3.3) | | | | | | |
| δ (PHMB-Quat) Significant? | | Ref. | Yes | Yes | | | | | | |

| | K | L | M | N | O | P | Q | R | S |
|---|---|---|---|---|---|---|---|---|---|
| Gloss | | | | | | | | | |
| Mean treatment δ | 0.9 | 0.0 | 1.5 | 1.4 | 0.3 | 5.6 | 0.7 | 2.5 | 8.1 |
| Treatment δ Std. Dev. | 0.53 | 0.24 | 0.41 | 0.43 | 0.46 | 0.8 | 0.64 | 0.56 | 2.79 |
| Mean δ (PHMB-noPHMB) | Ref. | (1.0) | | Ref. | (1.2) | | Ref. | 1.9 | |
| δ (PHMB-noPHMB) Significant? | Ref. | Yes | | Ref. | Yes | | Ref. | Yes | |
| Mean δ (PHMB-Quat) | | Ref. | (1.5) | | Ref. | (5.3) | | Ref. | (5.6) |
| t-statistic δ δ (PHMB-Quat) | | Ref. | Yes | | Ref. | Yes | | Ref. | Yes |
| Visual | | | | | | | | | |
| Mean grade | 0.9 | 0.4 | 1.9 | 0.2 | 0.1 | 1.8 | 1.5 | 2.5 | 2.6 |
| Treatment δ Std. Dev. | 0.43 | 0.25 | 0.6 | 0.18 | 0.15 | 0.54 | 0.56 | 0.46 | 0.74 |
| Mean δ (PHMB-noPHMB) | Ref. | (0.5) | | Ref. | (0.2) | | Ref. | 1.0 | |
| δ (PHMB-noPHMB) Significant? | Ref. | Yes | | Ref. | No | | Ref. | No | |
| Mean δ (PHMB-Quat) | | Ref. | 1.5 | | Ref. | | | Ref. | |
| δ (PHMB-Quat) Significant? | | Ref. | Yes | | Ref. | Yes | | Ref. | Yes |

| | T | U | V | W | X | Y | Z | ZZ | ZZZ | Z-IV |
|---|---|---|---|---|---|---|---|---|---|---|
| Gloss | | | | | | | | | | |
| Mean treatment δ | 1.5 | (0.2) | 1.6 | 0.5 | (9.0) | (4.1) | (4.1) | (3.9) | 0.6 | (1.9) |
| Treatment δ Std. Dev. | 0.45 | 1.32 | 0.59 | 0.5 | ? | 0.81 | 0.80 | 0.90 | 0.32 | 0.1 |
| Mean δ (PHMB-noPHMB) | Ref. | (1.7) | Ref. | (1.1) | (10.5) vs. T | (5.7) vs. V | (4.6) vs. A | (5.7) vs. G | Ref. | (2.5) |
| δ (PHMB-noPHMB) Significant? | Ref. | Yes | Yes | Yes | Yes | Yes | Yes | Yes | Ref. | Yes |
| Visual | | | | | | | | | | |
| Mean grade | 0.9 | 0.4 | 2.2 | 0.9 | 1.2 | 0.5 | 0.5 | 0.8 | 0.9 | 0.1 |
| Treatment δ Std. Dev. | 0.43 | 0.25 | 0.73 | 0.73 | 0.33 | 0.27 | 0.27 | 0.36 | 0.22 | 0.14 |
| Mean δ (PHMB-noPHMB) | Ref. | (0.5) | Ref. | 1.3 | 0.3 | (1.7) | 0.0 | (1.0) | Ref. | 0.8 |
| δ (PHMB-noPHMB) Significant? | Ref. | Yes | Ref. | Yes | No vs. T | Yes vs. V | No vs. A | Yes vs. G | Ref. | Yes |

-continued

| | E | F | AA | AB | AC | AD | AE | AF | AG | AH | AI |
|---|---|---|---|---|---|---|---|---|---|---|---|
| Gloss | | | | | | | | | | | |
| Mean treatment δ | 1.1 | (0.5) | 0.0 | (0.8) | 0.4 | (0.2) | 1.3 | 0.0 | 0.6 | (2.8) | 4.4 |
| Treatment δ Std. Dev. | 0.6 | 0.29 | 0.49 | 0.28 | 0.22 | 0.40 | 0.66 | 0.42 | 0.42 | 0.27 | 2.18 |
| Mean δ (PHMB-noPHMB) | Ref. | (1.6) | Ref. | (0.8) | Ref. | (0.6) | Ref. | (1.3) | Ref. | (3.4) | N/A |
| δ (PHMB-noPHMB) Significant? | Ref. | Yes | Ref. | Yes | Ref. | Yes | Ref. | Yes | Ref. | Yes | N/A |
| Visual | | | | | | | | | | | |
| Mean grade | 0.2 | 0.1 | 0.4 | 0.4 | 0.2 | 0.1 | 2.0 | 0.4 | 0.7 | 0.3 | 3.6 |
| Treatment δ Std. Dev. | 0.23 | 0.11 | 0.13 | 0.13 | 0.16 | 0.12 | 0.31 | 0.13 | 0.21 | 0.10 | 0.22 |
| Mean δ (PHMB-noPHMB) | Ref. | (0.2) | Ref. | 0.0 | Ref. | (0.1) | Ref. | (1.6) | Ref. | (0.4) | N/A |
| δ (PHMB-noPHMB) Significant? | Ref. | No | Ref. | No | Ref. | No | Ref. | Yes | Ref. | Yes | N/A |

| | A | B | C1 | C2 | C3 | C4 |
|---|---|---|---|---|---|---|
| Gloss | | | | | | |
| Mean treatment δ | 0.2 | (0.5) | 1.7 | 6.8 | 1.2 | 8.1 |
| Treatment δ Srd. Dev. | 0.28 | 0.29 | 0.83 | 1.54 | 0.45 | 2.79 |
| Mean δ (B-competitor) | Ref. | | 1.3 | 6.6 | 1.0 | 7.9 |
| δ (B-competitor) Significant? | Ref. | | Yes | Yes | Yes | Yes |
| Mean δ (F-competitor) | | Ref. | 2.0 | 7.3 | 1.7 | 8.6 |
| δ (F-competitor) Significant? | | Ref. | Yes | Yes | Yes | Yes |
| Visual | | | | | | |
| Mean treatment δ | 0.3 | 0.1 | 2.5 | 2.9 | 2.4 | 3.2 |
| Treatment δ Srd. Dev. | 0.2 | 0.11 | 0.93 | 0.68 | 0.64 | 0.53 |
| Mean δ (B-competitor) | Ref. | | 2.2 | 2.6 | 2.1 | 2.9 |
| δ (B-competitor) Significant? | Ref. | | Yes | Yes | Yes | Yes |
| Mean δ (F-competitor) | | Ref. | 2.4 | 2.8 | 2.3 | 3.1 |
| δ (F-competitor) Significant? | | Ref. | Yes | Yes | Yes | Yes |

Data Interpretation for Filming and Streaking:

All of the treatments exemplifying the invention (treatments B, F, H, J, L, O, U and W) show gloss reading losses of 1% or less. Treatment F and treatment Z-IV show a statistically significant gloss enhancement versus untreated tile (treatment E and treatment ZZZ). All of the treatments exemplifying the current invention have visual grades below 1.0, suggesting good consumer appeal.

Excluding the results obtained for compositions comprising quaternary ammonium antimicrobial agents which are not part of the present invention (treatments C, D, M, P and S), the gloss and visual grade results for the identical aqueous compositions impregnated on substrates 1, 2 and 3 are significantly better than for substrate 4 (compare results for treatments B, L and O with those for treatment R). This illustrates the benefits of using a substantially binder- and latex-free substrate.

The magnitude filming and streaking benefits provided by the compositions of the present invention are insensitive to the chemical composition of the substrate. The effect of higher release for the 100% synthetic substrate, which results in lower gloss for treatment N versus treatments A and K (all without PHMB), is completely negated by addition of the polymer. The data and associated trends for substrates 1, 2, and 3 are similar (see results for treatments A, B and C, treatments K, L and M, and treatments N, O and P), despite the fact that the chemical composition of the three substrates spans the full range: from 100% synthetic to 100% non-synthetic.

0.3% PHMB provides gloss enhancement versus identical compositions that do not comprise PHMB (compare results for treatments A and B, E and F, G and H, K and L, and N and O, T and U, V and W, ZZZ and Z-IV, and AH and AI). Significant visual grade benefits are also achieved in all but two cases (see results for treatments A and B, E and F, G and H, I and J, K and L, and T and U, ZZZ and Z-IV, and AH and AI).

All compositions that comprise 1% PHMB (treatments X, Y, Z, ZZ) have significantly higher gloss on tile than untreated tiles, and significantly higher gloss on tile than similar compositions that do not comprise PHMB.

All compositions of the invention show significant gloss and visual grade advantages relative to identical compositions that substitute quaternary ammonium surfactant for PHMB (compare the gloss readings and visual grades for treatments B, C and D, L and M and N and O).

The visual grade results provided by each of the low residue surfactants are significantly better than that provided by the "non low residue" surfactant. Additionally, PHMB can strongly impact the streaking due to the preferred non-low residue surfactant (see results for treatments I and J).

The gloss readings and visual grades for the preferred pre-moistened wipes of the present invention are significantly better than each of the competitive products. It is interesting to note that composition C3, which shows the best mean gloss reading and mean visual grade among the competitors, comprises a hydroentangled (binder-free) substrate. Composition C4, which has the worst mean gloss reading and mean visual grade among the competitors, comprises a substrate with binder.

All compositions comprising an organic acid show polymeric biguanide-induced gloss benefits (see F vs E, AB vs AA and AD vs. AC, AF vs. AE). Additionally, composition AF shows a significant visual grade enhancement versus composition AE. The visual grade differences are smaller for the other treatments because of the good appearance of compositions not comprising PHMB.

Compositions AH and AI are near neutral pH (6). Composition AI, which comprises PHMB shows significantly improved gloss and visual readings on tile versus composition AH. Composition AJ, which has an alkaline pH, shows significantly worse gloss and visual readings on tile versus composition AI.

Cleaning Test Results

To illustrate the preferred embodiment wherein substrates that comprise at least 20% synthetic fibers are employed, compositions B, L, O and R are tested for tough kitchen dirt. As the chemical composition of the lotions and the substrate load factors are all standardized, the tests directly measure substrate effects on cleaning.

| | B | L | O | R |
|---|---|---|---|---|
| Kitchen Dirt Soil | | | | |
| Mean # strokes to clean | 39.5 | 100* | 19 | 100* |
| Std. Dev. (strokes) | 2.6 | N/A | 5.3 | N/A |
| Mean δ (B-O) | 20.9 | | | |
| δ (B-O) Significant? | Yes | | | |
| | A | B | E | F |
| Kitchen Dirt | | | | |
| Mean # strokes to clean | 21.5 | 24.5 | 23.5 | 18.0 |
| Std. Dev. (strokes) | 3.0 | 3.0 | 4.1 | 1.6 |
| Mean # strokes A-B/E-F | 3.0 | | 5.5 | |
| A-B and E-F Significant? | No | | Yes | |

*Complete removal was not achieved in 100 strokes (at least one replicate)

Wipes L and R, which comprise substrate that do not contain synthetic fibers, do not consistently clean the soil within 100 strokes. Wipe B, which comprises a substrate with 60% synthetic fibers, completely cleans the soil in 39.5 strokes, significantly better than wipes L and R, which do not include synthetic fibers. Wipe O, which comprises a substrate with 100% synthetic fibers cleans the soil in 19 strokes, significantly better than substrate B. The cleaning effectiveness ranking is therefore: 100% synthetic>60% synthetic>0% synthetic.

Wipes A and B, which differ only in that B also comprises PHMB, do not show significant differences in cleaning differences. Wipe F, which comprises PHMB, shows a significant cleaning benefit versus wipe E, which is identical in all respects to wipe F, except that it does not comprise PHMB. The data illustrate that PHMB can be used in selected compositions to improve cleaning performance.

Antimicrobial Effectiveness:

In a highly preferred embodiment, the compositions of the present invention also provide antimicrobial benefits. The results below were obtained for a composition consisting of substrate 1 loaded at 3.2× with a composition similar to B at three different levels citric acid was used in this test.* The study was conducted by qualified Viromed technicians at Viromed (Minnesota, USA), a U.S. EPA approved antimicrobial laboratory.

| | Citric Acid level | | |
|---|---|---|---|
| | 0.25% | 0.50% | 0.75% |
| *Staphylococcus aureus* | 0/60 | 0/60 | 0/60 |
| *Pseudomonas aeruginosa* | 0/60 | 0/60 | 0/60 |
| *Salmonella cholerasuis* | 0/60 | 0/60 | 0/60 |

*Perfume level is 0.175%, ethanol level is 2%

Under each of the conditions studied, the compositions were fully biocidal against the target organisms. The level of PHMB in these compositions (0.3%) is virtually identical to the level of quaternary ammonium surfactant utilized by Lysol® and Clorox® wipes to make similar antimicrobial claims.

What is claimed is:

1. A pre-moistened wipe far treating a surface, said pre-moistened wipe comprising:

(a) a substrate; wherein said substrate is substantially free of a binder or latex material; and (b) an aqueous composition applied to said substrate, said composition having a pH of about 7 or less; and comprising:

(i) at least one surfactant; and (ii) from 0.3% to about 2% by weight of a polymeric biguanide, or salt thereof, or mixtures thereof, wherein said aqueous composition imparts a filming/streaking performance benefit.

2. The pre-moistened wipe of claim 1 wherein said substrate is made by a hydroentangling process.

3. The pre-moistened wipe of claim 1 wherein said surfactant is an alkyl polyglycoside, wherein said substrate comprises at least about 50% synthetic fibers by weight and wherein the pH of said composition is from about 0.5 to about 7.

4. The pre-moistened wipe of claim 1 wherein said composition comprises an organic acid.

5. The pre-moistened wipe of claim 4 wherein said organic acid is selected from the group consisting of citric acid, lactic acid, tartaric acid and mixtures thereof.

6. The pry-moistened wipe of claim 5 wherein said organic acid is citric acid and the biguanide or salt thereof or mixtures thereof comprises at least 0.5% by weight of the aqueous composition.

7. The pre-moistened wipe of claim 1 wherein said surfactant is a low-residue surfactant.

8. The pre-moistened wipe of claim 7 wherein said low-residue surfactant is selected from the group consisting of zwitterionic, amphoteric surfactants, non-ionic surfactants comprising at least one sugar moiety and mixtures thereof.

9. The pre-moistened wipe of claim 8 wherein said low-residue surfactant is selected from the group consisting of sulfobetaines, ampho glycinates, ampho propionates, betaines, poly alkyl glycosides, sucrose esters and mixtures thereof.

10. The pre-moistened wipe of claim 9 wherein said low-residue surfactant is selected from the group consisting of sulfobetaines, poly alkyl glycosides, and mixtures thereof.

11. The pre-moistened wipe of claim 1 wherein said surfactant is selected from the group consisting of alkyl ethoxylates, capped alkyl ethoxylates and mixtures thereof, wherein said surfactant comprises from about 8 to about 18 carbon atoms in the hydrophobic chain-length, and an average of about 1 to about 15 ethoxy moieties per surfactant molecule.

12. The pre-moistened wipe of claim 1 wherein said polymeric biguanide is selected from the group consisting of oligo-hexamethylene biguanide, poly-hexamethylene biguanide, salts thereof and a mixture thereof.

13. The pre-moistened wipe of claim 12 wherein said polymeric biguanide salt is poly (hexamethylene biguanide) hydrochloride.

14. The pre-moistened wipe of claim 4 wherein the level of said acid is from about 0.01% to about 3% by weight; the level of said surfactant is from about 0.01% to about 1.5% by weight: the level of said polymeric biguanide or salt thereof or mixture thereof is from 0.5% to about 2% by weight; and the pH of said composition is from about 0.5 to about 7.

15. The pre-moistened wipe of claim 14 wherein the level of said acid is from about 0.05% to about 2% by weight; the level of said surfactant is from about 0.01% to about 1.0% by weight; the level of polymeric biguanide or salt thereof or mixture thereof is from 0.5% to about 1.0% by weight; and the pH of said composition is from about 2.0 to about 5.5.

16. The pre-moistened wipe of claim 15 wherein the level of said acid is from about 0.1% to about 1% by weight; the level of surfactant is from about 0.01% to about 0.5% by weight; the level of said polymeric biguanide or salt thereof or mixture thereof is from 0.5% to about 0.75% by weight; and the pH of the aqueous composition is from about 2.5 to about 5.

17. A pre-moistened wipe according to claim 1 further comprising from about 0.5% to about 25% by weight of a solvent.

18. The pre-moistened wipe of claim 17 wherein said solvent has a vapour pressure of about 6.66 Pa (about 0.05 mm Hg at 25° C. and atmospheric pressure).

19. The pre-moistened wipe of claim 1 further comprising a hydrotrope.

20. The pre-moistened wipe of claim 19 wherein said hydrotrope is an alkyl ethoxylate comprising from about 8 to about 18 carbon atoms in the hydrophobic group and at least an average of about 15 ethoxylate groups per hydrophobic group.

21. The pre-moistened wipe of claim 1 wherein said substrate is loaded at a factor of from about 1 gram of aqueous solution per gram of substrate to about 10 grams of aqueous solution per gram of substrate.

22. The pre-moistened wipe of claim 1 wherein said substrate comprises a homogeneous blend of synthetic and non-synthetic fibers.

23. The pre-moistened wipe of claim 1 wherein said substrate comprises a non-homogeneous blend of fibers such that at least one of the visible surface areas of the substrate has a significantly higher synthetic content than the overall substrate composition.

24. The pre-moistened wipe of claim 1 wherein the synthetic content by weight of the overall substrate is at least about 20% preferably at least about 30%.

25. The pre-moistened wipe of claim 24 wherein said synthetic material is selected from the group consisting of polyethylene, polypropylene, polyester and mixtures thereof.

26. The pre-moistened wipe of claim 1, wherein said composition provides antimicrobial benefits.

27. A method of cleaning a surface, comprising the steps of:

contacting said surface with a pre-moistened wipe according to claim 1, and wiping said surface with said wipe.

* * * * *

UNITED STATES PATENT AND TRADEMARK OFFICE

CERTIFICATE OF CORRECTION

PATENT NO. : 7,417,000 B2
APPLICATION NO. : 10/947777
DATED : August 26, 2008
INVENTOR(S) : Mary Vijayarani Barnabas et al.

It is certified that error appears in the above-identified patent and that said Letters Patent is hereby corrected as shown below:

Title Page

Item (73) Assignee: delete "Gamle" and insert -- Gamble --.

Column 5

Line 24, delete "Tencel®D" and insert -- Tencel® --.

Column 11

Line 47, delete "(x" and insert -- α --.

Line 60, delete "(X" and insert -- α --.

Column 18

Line 27, delete "(a" and insert -- (α --.

Column 26

Line 30, delete "GB4520." and insert -- GB-4520. --.

Column 30

Line 1, delete "E021," and insert -- EO21, --.

Column 31

Line 35, delete "6" and insert -- δ --.

Claim 1

Line 1, delete "far" and insert -- for --.

Claim 6

Line 1, delete "pry-moistened" and insert -- pre-moistened --.

UNITED STATES PATENT AND TRADEMARK OFFICE

CERTIFICATE OF CORRECTION

PATENT NO. : 7,417,000 B2
APPLICATION NO. : 10/947777
DATED : August 26, 2008
INVENTOR(S) : Mary Vijayarani Barnabas et al.

It is certified that error appears in the above-identified patent and that said Letters Patent is hereby corrected as shown below:

Claim 14

Line 4, delete "weight:" and insert -- weight; --.

Signed and Sealed this

Sixth Day of October, 2009

David J. Kappos
*Director of the United States Patent and Trademark Office*

UNITED STATES PATENT AND TRADEMARK OFFICE

CERTIFICATE OF CORRECTION

PATENT NO. : 7,417,000 B2
APPLICATION NO. : 10/947777
DATED : August 26, 2008
INVENTOR(S) : Mary Vijayarani Barnabas et al.

It is certified that error appears in the above-identified patent and that said Letters Patent is hereby corrected as shown below:

<u>Title Page</u>

Item (73) Assignee: delete “Gamle” and insert -- Gamble --.

<u>Column 5</u>

Line 24, delete “Tencel®D” and insert -- Tencel® --.

<u>Column 11</u>

Line 47, delete “(x” and insert -- α --.

Line 60, delete “(X” and insert -- α --.

<u>Column 18</u>

Line 27, delete “(a” and insert -- (α --.

<u>Column 26</u>

Line 30, delete “GB4520.” and insert -- GB-4520. --.

<u>Column 30</u>

Line 1, delete “E021,” and insert -- EO21, --.

<u>Column 31</u>

Line 35, delete “6” and insert -- δ --.

<u>Column 38, Claim 1</u>

Line 31, delete “far” and insert -- for --.

<u>Column 38, Claim 6</u>

Line 56, delete “pry-moistened” and insert -- pre-moistened --.

UNITED STATES PATENT AND TRADEMARK OFFICE

CERTIFICATE OF CORRECTION

PATENT NO. : 7,417,000 B2 
APPLICATION NO. : 10/947777
DATED : August 26, 2008
INVENTOR(S) : Mary Vijayarani Barnabas et al.

It is certified that error appears in the above-identified patent and that said Letters Patent is hereby corrected as shown below:

<u>Column 39, Claim 14</u>

Line 24, delete “weight:” and insert -- weight; --.

This certificate supersedes the Certificate of Correction issued October 6, 2009.

Signed and Sealed this

Twenty-seventh Day of October, 2009

David J. Kappos
*Director of the United States Patent and Trademark Office*